US008657321B2

(12) United States Patent
Kashiwai et al.

(10) Patent No.: US 8,657,321 B2
(45) Date of Patent: Feb. 25, 2014

(54) MOTORCYCLE

(75) Inventors: Mikio Kashiwai, Saitama (JP); Konomu Hoshi, Saitama (JP); Takeshi Kimishima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 758 days.

(21) Appl. No.: 12/817,649

(22) Filed: Jun. 17, 2010

(65) Prior Publication Data
US 2010/0320723 A1 Dec. 23, 2010

(30) Foreign Application Priority Data
Jun. 19, 2009 (JP) ................. 2009-146062

(51) Int. Cl.
*B62K 11/02* (2006.01)
*F16M 7/00* (2006.01)

(52) U.S. Cl.
USPC ............ 280/275; 280/283; 180/228; 267/136

(58) Field of Classification Search
USPC ............ 180/228, 299; 267/136; 280/275, 283
See application file for complete search history.

(56) References Cited

U.S. PATENT DOCUMENTS

| 3,542,146 A | * | 11/1970 | Trigg et al. | 180/228 |
| 3,722,612 A | * | 3/1973 | Issigonis et al. | 180/227 |
| 4,066,142 A | * | 1/1978 | Hooper | 180/228 |
| 6,250,441 B1 | * | 6/2001 | Shimoda | 188/322.5 |
| 6,854,721 B2 | * | 2/2005 | Kato et al. | 267/140.4 |
| 7,789,186 B2 | * | 9/2010 | Shimozato et al. | 180/299 |
| 2002/0030313 A1 | * | 3/2002 | Herbst | 267/136 |
| 2002/0066611 A1 | * | 6/2002 | Lane et al. | 180/228 |
| 2004/0007409 A1 | * | 1/2004 | Keller et al. | 180/228 |
| 2011/0226543 A1 | * | 9/2011 | Kashiwai et al. | 180/299 |

FOREIGN PATENT DOCUMENTS

| JP | 62-137287 A | 6/1987 |
| JP | 3-40700 Y2 | 8/1991 |
| JP | 2007-145268 A | 6/2007 |
| JP | 2009190454 A | * 8/2009 |

* cited by examiner

*Primary Examiner* — Paul N Dickson
*Assistant Examiner* — Daniel Yeagley
(74) *Attorney, Agent, or Firm* — Birch, Stewart, Kolasch & Birch, LLP

(57) ABSTRACT

To obtain vibration characteristics suited to a plurality of operating modes. A first member is mounted on at least one of a left side frame of a vehicle and a right side frame of the vehicle. The first member extends towards the right frame or the left frame. A second member is mounted to at least one of the right side frame of the vehicle and a left side frame. The second member extends towards the left frame or the right frame. A vibration insulating member is provided between the first member and the second member and elastically couples the first and second members to each other.

14 Claims, 17 Drawing Sheets

MOTORCYCLE

CROSS-REFERENCE TO RELATED APPLICATIONS

The present application claims priority under 35 USC 119 to Japanese Patent Application No. 2009-146062 filed on Jun. 19, 2009 the entire contents of which are hereby incorporated by reference.

BACKGROUND OF THE INVENTION

1. Field of the Invention

The present invention relates to a motorcycle. More particularly, the invention relates to a motorcycle in which a damping element is used in a structural part for coupling left and right portions of a vehicle body frame to each other to thereby ensure that vibration characteristics (dynamic flexure characteristics) of the vehicle body can be adjusted.

2. Description of Background Art

In general, a vehicle body of a motorcycle is configured by a method in which members formed of metal, such as steel or a light alloy, are connected to each other by welding or coupling with screws. The maneuverability and ride quality of such a vehicle body can be adjusted to a certain extent by varying the rigidity of the vehicle body. However, the adjustment by varying the rigidity is an adjustment by varying the spring constant of the vehicle body. Since variations in damping characteristics of the vehicle body are slight even when the spring constant of the vehicle body is varied, it is difficult to adjust the damping characteristics by varying the rigidity of the vehicle body.

Thus, it is very difficult work to attain vibration characteristics of parts of the vehicle body suited to a plurality of running modes by only varying the spring constant of the vehicle body.

A conventional motorcycle is known, see for example Japanese Patent Laid-open No. Sho 62-137287, in which a vehicle body frame is provided with joint parts (15, 16) and a damping member (20) intermediately provided at the joint parts (15, 16), for the purpose of dispersing lateral vibrations generated in the vehicle body, reducing the amplitude of low-frequency vibrations and thereby achieving a further enhanced ride quality.

In this motorcycle, however, as seen in FIG. 2 in Japanese Patent Laid-open No. Sho 62-137287, the joint parts (15, 16) are provided only for the frames disposed on the left and right sides in the vehicle body, so that it is difficult to obtain vibration characteristics suitable for a plurality of running modes.

In addition, another conventional motorcycle is known, see for example Japanese Patent Laid-open No. 2007-145268, wherein an elastic coupling part (35) for coupling front and rear frame pipes (36, 37) as component members of a vehicle body frame (5) to each other through an elastic member (41) is provided at a part of the vehicle body frame (5).

In this motorcycle, however, as seen in FIG. 1 in Japanese Patent Laid-open No. 2007-145268, the elastic coupling part (35) is provided only for a frame disposed along the front-rear direction at the center of the vehicle body. Therefore, it is again difficult to obtain vibration characteristics suited to a plurality of running modes.

In addition, as set forth in Japanese Utility Model Publication No. Hei 03-040700 for example (the claims, and object paragraphs), a performance rod mounting structure for automobile is known, wherein rear end portions of the performance rods are opened wider toward the vehicle body front side substantially in the form of an obtuse "V" separated at the vertex thereof and are secured to vehicle body portions on the front side of the vehicle compartment. Further, front end portions of the performance rods are secured to vehicle body side portions. In such a performance rod mounting structure, vibrations from the engine and the suspension may be transmitted to the vehicle body portions on the front side of the vehicle compartment through the performance rods, possibly resulting in the generation of noise. More specifically, a booming noise in the vehicle compartment. In order to eliminate the possibility of the generation of the noise, in this mounting structure, a weight is attached to the rear end portions of the performance rods through elastic bodies, respectively, so that the weight and the elastic bodies form a dynamic damper.

According to this mounting structure, the generation of noise in the vehicle compartment can be suppressed by the action of the dynamic damper. Since the dynamic damper is only provided in the vehicle body, however, it is impossible to obtain vibration characteristics suited to a plurality of running modes.

SUMMARY AND OBJECTS OF THE INVENTION

It is an object of the present invention to provide a motorcycle in which vibration characteristics suited to a plurality of running modes can be obtained.

In order to solve the above-mentioned problem, according to an embodiment of the present invention, a motorcycle is provided having frames disposed on the left and right sides in a vehicle body wherein the motorcycle includes:

a first member mounted to one frame of the left and right frames and extending toward the other frame;

a second member mounted to the other frame of the left and right frames and extending toward the one frame; and a vibration insulating member provided between the first member and the second member so as to elastically couple the first and second members to each other.

According to this embodiment, the first and second members for coupling the left and right frames to each other in the vehicle width direction are elastically coupled to each other by use of the vibration insulating member, so that damping characteristics can be adjusted by regulating the stiffness (elastic modulus) of the vibration insulating member.

In addition, according to an embodiment of the present invention, the vibration insulating member is provided between the first and second members for coupling the left and right frames together in the vehicle width direction, instead of being provided for the left and right frames extending in the front-rear direction of the vehicle body (see, Japanese Patent Laid-open No. Sho 62-137287) or being provided for the frame disposed along the front-rear direction at the center of the vehicle body (see, Japanese Patent Laid-open No. 2007-145268). This makes it easy to adjust the vibration characteristics while securing rigidity, particularly, torsional rigidity, of the vehicle body. As a result, the maneuverability and ride quality of the vehicle body can be enhanced.

Desirably, the first member and the second member overlap with each other along the vehicle width direction. The overlapping parts of the first and second members are elastically coupled together through the vibration insulating member.

This configuration ensures that, due to the overlapping of the first member and the second member along the vehicle width direction, it becomes easy to secure the rigidity of the vehicle body. In addition, with the overlapping parts coupled together by the vibration insulating member, it becomes easy to secure the volume (capacity) of the vibration insulating member, and it becomes easy to secure a damping ability. Therefore, it becomes easy to secure the rigidity of the vehicle body and, simultaneously, the span of adjustable range of vibration characteristics can be widened, which makes it easy to adjust the vibration characteristics.

In this case, further desirably, both the first member and the second member are L shaped in section as viewed in the vehicle width direction, and they are elastically coupled together along the L shape through the vibration insulating member.

This configuration makes it easy to further enhance the rigidity of the vehicle body. In addition, since the overlapping parts of the first member and the second member can be enlarged, it becomes easier to secure the volume (capacity) of the vibration insulating member, and to secure the damping ability in response to slight deformations of the vehicle body frames. Therefore, it becomes easier to secure the rigidity of the vehicle body and, simultaneously, the span of adjustable range of vibration characteristics can be more widened, which makes it easier to adjust the vibration characteristics.

In addition, each of the first member and the second member has a mounting part for mounting to the frame, and a plurality of extending parts extending in the vehicle width direction from the mounting part. The vibration insulating member is provided between each adjacent pair of the extending parts.

According to this configuration, the left and right frames are elastically coupled together by a plurality of layers of the extending part and the vibration insulating member, so that the rigidity and vibration characteristics of the vehicle body can be adjusted easily and delicately.

In addition, the motorcycle has a fastening member for fastening the first member and the second member to each other through the vibration insulating member while compressing the vibration insulating member.

This configuration ensures that, by regulating the fastening force exerted by the fastening member, it is possible to adjust both the rigidity and the vibration characteristics of the vehicle body simultaneously and easily.

In this instance, desirably, a plurality of the fastening members are provided.

This configuration makes it possible, by regulating the fastening forces exerted by the plurality of fastening members, to adjust both the rigidity and the vibration characteristics of the vehicle body simultaneously, easily and delicately.

Further, an actuator for operating the fastening member, a vehicle speed sensor for detecting at least the vehicle speed of the motorcycle, and a control unit for controlling the operation of the fastening member on the basis of the vehicle speed detected by the vehicle speed sensor to thereby adjust the fastening force and the compressing force exerted by the fastening member, are provided.

This configuration ensures that during operation of the motorcycle, the rigidity and vibration characteristics of the vehicle body which are appropriate according to at least the vehicle speed can be obtained automatically and at any time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8(a) to 8(d) are views illustrating a modification of the elastic coupling part, wherein FIG. 8(a) is a perspective view, FIG. 8(b) is a plan view, FIG. 8(c) is a side view of FIG. 8(b), and FIG. 8(d) is a bottom view;

FIGS. 9(a) to 9(d) are views illustrating another modification of the elastic coupling part, wherein FIG. 9(a) is a perspective view, FIG. 9(b) is a plan view, FIG. 9(c) is a side view of FIG. 9(b), and FIG. 9(d) is a bottom view;

FIGS. 10(a) and 10(b) are views illustrating a modification of the vehicle body frame, wherein FIG. 10(a) is a partial perspective view from the front side, and FIG. 10(b) is a sectional view of a major part;

FIGS. 11(a) and 11(b) are views illustrating another modification of the vehicle body frame, wherein FIG. 11(a) is a perspective view, and FIG. 11(b) is an enlarged sectional view of a major part;

FIGS. 12(a) to 12(c) are schematic views of another embodiment of the motorcycle according to the invention, wherein FIG. 12(a) is a plan view, FIG. 12(b) is a side view, and FIG. 12(c) is a perspective view of an actuator for operating the fastening member;

FIGS. 14(a) and 14(b) are schematic views of a further embodiment of the motorcycle according to the invention, wherein FIG. 14(a) is a plan view, and FIG. 14(b) is a side view;

FIGS. 16(a) and 16(b) are schematic views of yet another embodiment of the motorcycle according to the invention, wherein FIG. 16(a) is a plan view, and FIG. 16(b) is a side view.

DETAILED DESCRIPTION OF THE PREFERRED EMBODIMENTS

Figure 1:
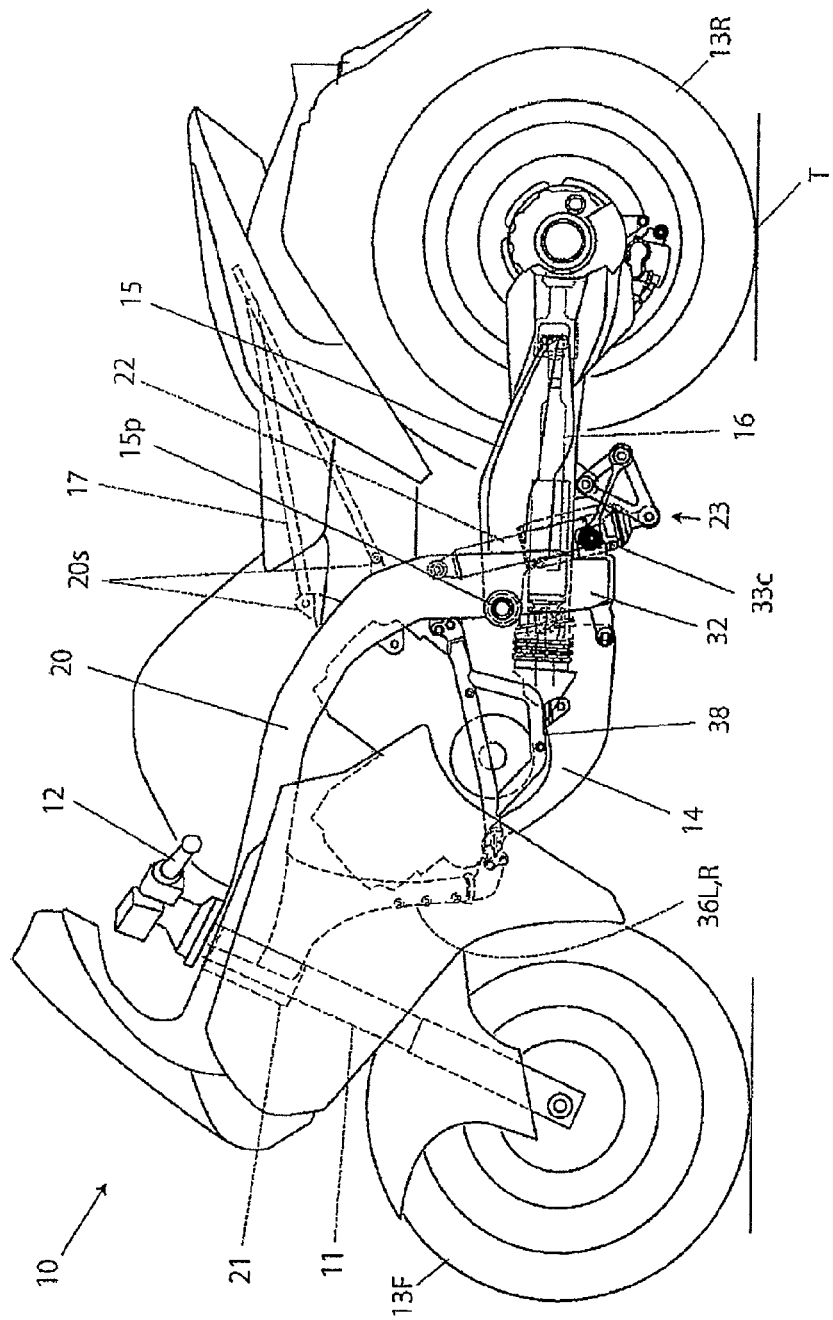
FIG. 1 is a left side view showing an embodiment of the motorcycle according to the present invention.

Embodiments of the motorcycle according to the present invention will be described below, referring to the drawings.

FIG. 1 is a left side view of an embodiment of the motorcycle according to the present invention.

The motorcycle 10 has a frame (vehicle body frame) 20 constituting a vehicle body. A front fork 11 is steerably mounted to a head pipe 21 constituting a front end of the vehicle body frame 20, and a handlebar 12 is mounted to an upper portion of the front fork 11. A front wheel 13F is rotatably mounted to lower ends of the front fork 11. An engine 14 is secured to the vehicle body frame 20. A swing arm 15 is vertically swingably mounted to a rear portion of the vehicle body frame 20 through a pivot shaft 15p, and a rear wheel 13R as a driving wheel is rotatably mounted to a rear end portion of the swing arm 15. The rear wheel 13R is driven through a drive shaft 16 disposed between itself and the engine 14.

Figure 2:
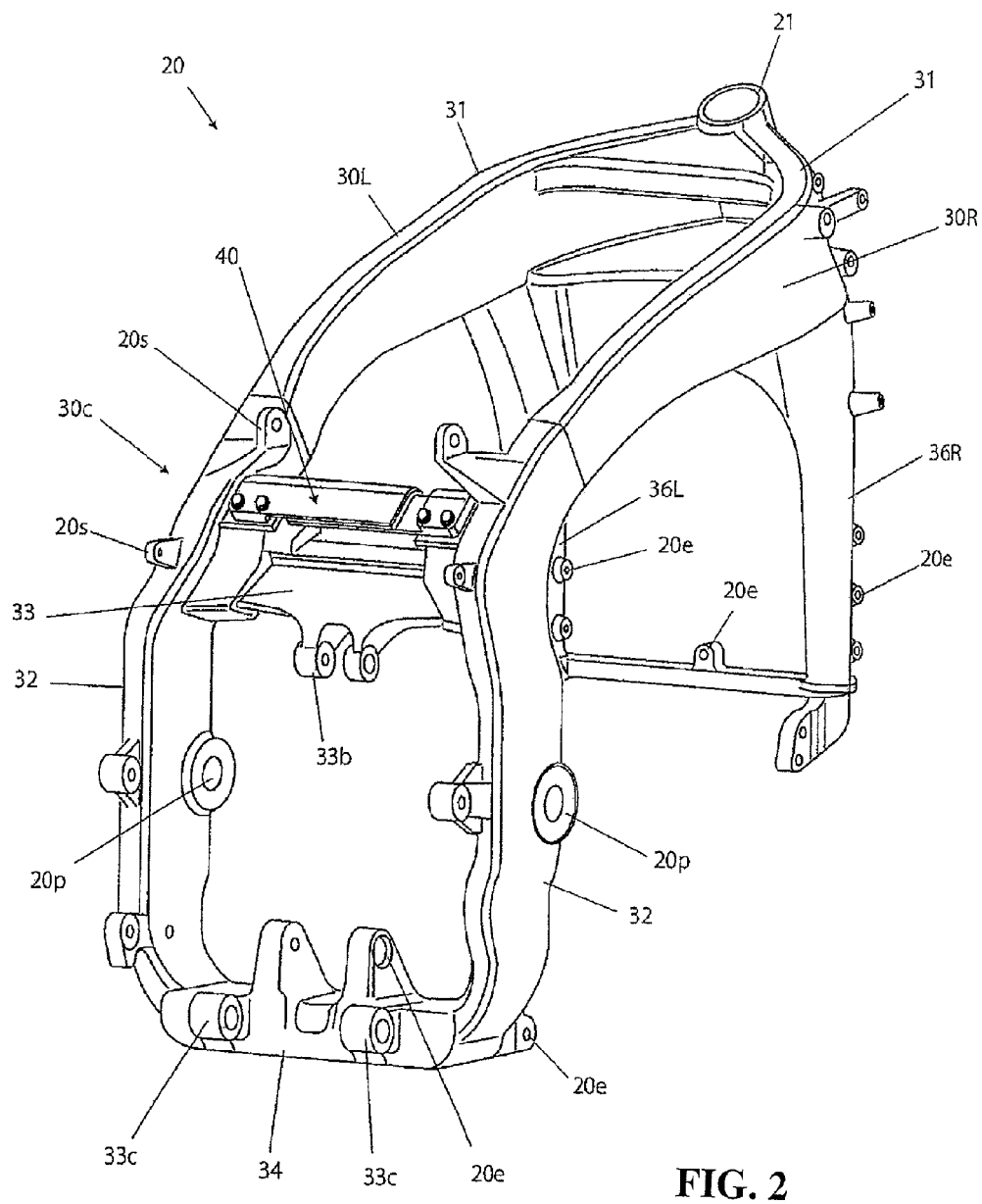
FIG. 2 is a perspective view, from a skew rear side, of a vehicle body frame.
Figure 3:
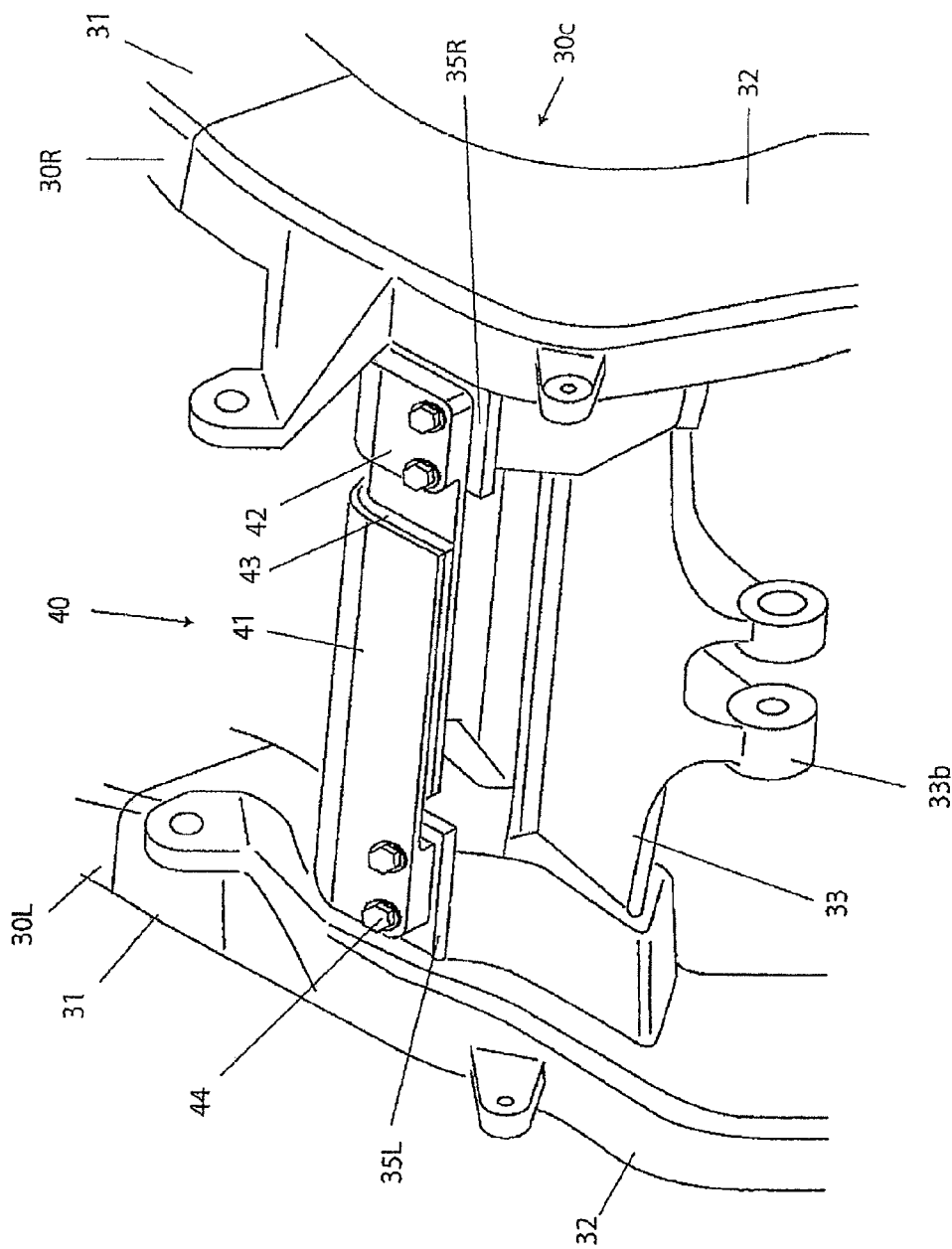
FIG. 3 is an enlarged view of part of FIG. 2.
Figure 4:
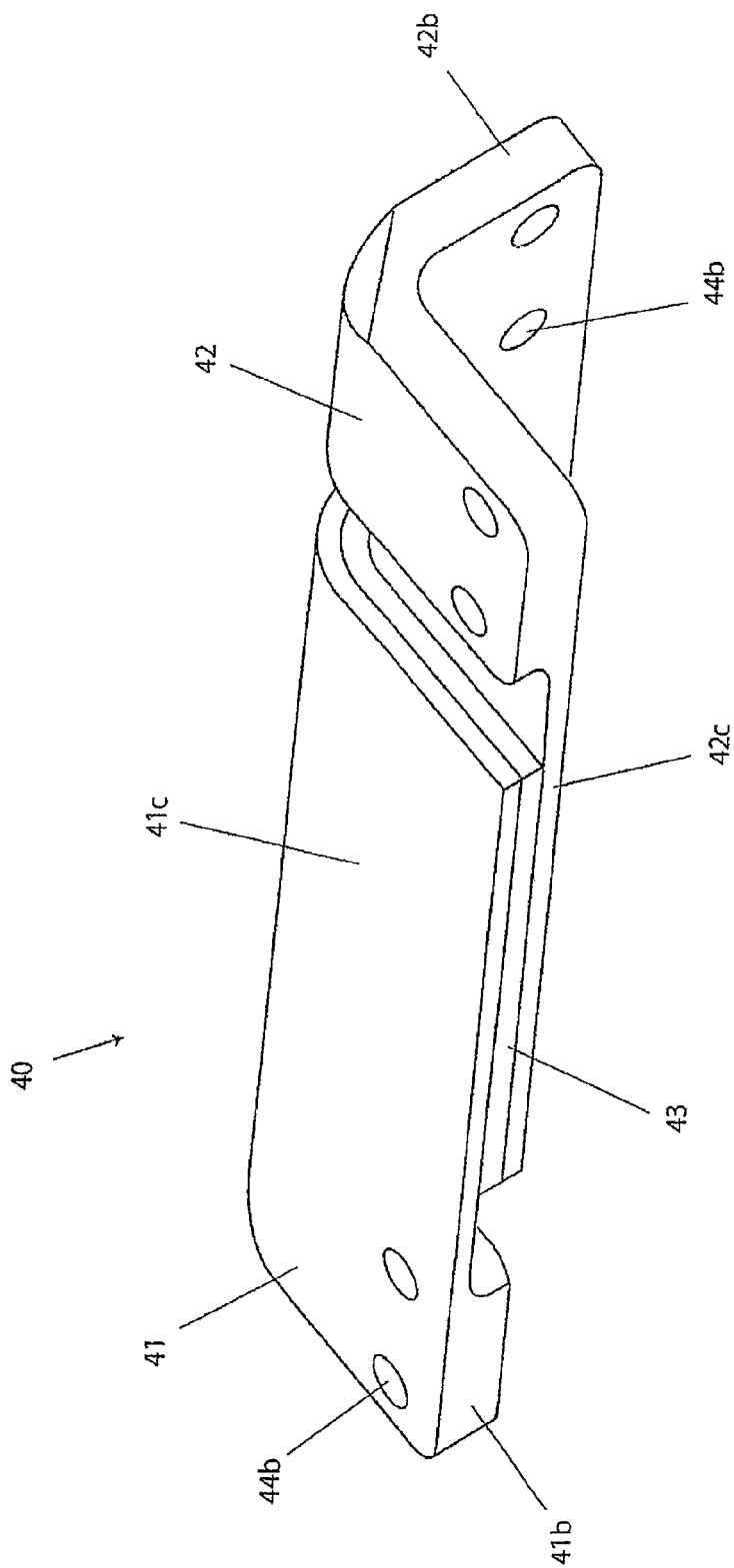
FIG. 4 is a perspective view of first and second members and a vibration insulating member.

FIG. 2 is a perspective view, from a skew rear side, of the vehicle body frame 20, FIG. 3 is an enlarged view of a part of FIG. 2, and FIG. 4 is a perspective view of first and second members and a vibration insulating member.

As shown in FIGS. 2-4, the vehicle body frame 20 includes left and right frames 30L and 30R which extend integrally from the head pipe 21 toward left and right rear sides respectively and which are disposed respectively on the left and right sides in the vehicle body; a first member 41 which is mounted to one frame 30L of the left and right frames 30L and 30R and which extends toward the other frame 30R; a second member 42 which is mounted to the other frame 30R of the left and right frames 30L and 30R and which extends toward the one frame 30L and a vibration insulating member 43 which is provided between the first member 41 and the second member 42 and which elastically couple the first and second members 41 and 42 to each other.

Each of the left and right frames 30L and 30R has a main frame 31 extending rearwardly from the head pipe 21, and a pivot plate 32 extending integrally from the rear end of the main frame 31 toward the lower side.

The left and right frames 30L and 30R are integrally coupled to each other by an upper cross member 33 at their bent or curved parts 30C each of which extends from the main frame 31 to the pivot plate 32. In addition, the lower ends of the pivot plates 32 are integrally coupled to each other by a lower cross member 34.

An elastic coupling part 40 having the first and second members 41 and 42 and the vibration insulating member 43 is disposed in proximity to and on the upper side of the upper cross member 33, at the bent or curved part 30C.

Both the first member 41 and the second member 42 are L shaped in section as viewed in the vehicle width direction (see FIG. 4), and are elastically coupled to each other through the vibration insulating member 43 along the L shape thereof.

The first member 41 has a mounting part 41b for mounting to the left frame 30L, and an extending part 41c which extends along the vehicle width direction from the mounting part 41b. On the other hand, the second member 42 has a mounting part 42b for mounting to the right frame 30R, and an extending part 42c which extends along the vehicle width direction from the mounting part 42b. The extending parts 41c and 42c overlap with each other along the vehicle width direction, and the extending parts 41c and 42c are elastically coupled to each other at their overlapping portions through the vibration insulating member 43.

The left frame 30L is integrally provided on its inner side with a coupling part 35L for coupling to the first member 41, and the right frame 30R is integrally provided on its inner side with a coupling part 35R for coupling to the second member 42. The mounting parts 41b and 42b of the first and second members are secured to the coupling parts 35L and 35R by bolts 44, whereby the left and right frames 30L and 30R are elastically coupled to each other through the first and second members 41 and 42 and the vibration insulating member 43. In addition, as illustrated in FIG. 4, a hole 44b is provided in which to insert the bolt 44. While the left and right frames 30L and 30R and the first and second members 41 and 42 are separate members in this embodiment, a configuration may be adopted in which the frame 30L and the first member 41 are integral with each other whereas the frame 30R and the second member 42 are integral with each other.

The first and second members 41 and 42 may be formed from the same material (for example, an aluminum alloy) as the material of the left and right frames 30L and 30R, and the vibration insulating member 43 may be formed of a vibration isolating rubber. As the means for coupling the first and second members 41, 42 to the vibration insulating member 43, a known adhesion means (for example, vulcanization adhesion or the like) can be used.

To the vehicle body frame 20 as above-described, component parts of the motorcycle 10 shown in FIG. 1 are mounted in the following manner.

The front fork 11 is mounted to the head pipe 21.

Down tubes 36L and 36R are respectively provided integrally at front portions of the left and right frames 30L and 30R, and the engine 14 is mounted between the down tubes 36 (L, R) and the pivot plates 32. In FIG. 2, symbol 20e denotes each of mounting parts for the engine 14.

A pivot shaft 15p is provided between the pivot plates 32, 32, and the swing arm 15 is vertically swingably mounted through the pivot plate 15p. In FIG. 2, symbol 20p denotes each of mounting parts for the pivot shaft 15p.

The swing arm 15 and the vehicle body frame 20 are coupled to each other through a known shock absorber 22 and a known link mechanism 23. The upper end of the shock absorber 22 is turnably mounted to a support part 33b provided in the upper cross member 33, and the lower end of the shock absorber 22 is coupled to the link mechanism 23. One end of the link mechanism 23 is turnably coupled to support parts 33c provided at lower portions of the pivot plates 32. In addition, in FIG. 2 a mounting part 20s is provided for a seat rail 17 (FIG. 1).

According to the motorcycle as above, the following operational advantages can be obtained.

Since the first and second members 41 and 42 for coupling the left and right frames 30L and 30R to each other along the vehicle width direction are elastically coupled together by use of the vibration insulating member 43, damping characteristics can be adjusted by regulating the stiffness (elastic modulus) of the vibration insulating member 43.

In addition, the vibration insulating member 43 is provided between the first and second members 41 and 42 coupling the left and right frames 30L and 30R along the vehicle width direction, instead of being provided for the left and right frames 30L and 30R themselves extending in the front-rear direction of the vehicle body or being provided for the frame (see, Japanese Patent Laid-open No. 2007-145268) disposed in the front-rear direction at the center of the vehicle body. Therefore, it becomes easy to adjust vibration characteristics while securing rigidity, particularly, torsional rigidity, of the vehicle body, by regulating the rigidities of the first and second members 41 and 42 and the vibration insulating member 43. As a result, the maneuverability and ride quality of the vehicle body can be enhanced.

In the motorcycle which has a frame structure such that each of the left and right frames 30L and 30R has the main frame 31 extending rearwardly from a front portion and the pivot plate 32 extending downwardly from the rear end of the main frame 31, with the bent or curved parts 30C, which extend from the main frame 31 to the pivot plate 32, being coupled to each other by the cross member 33 and the coupling part 40, and in which the swing arm 15 is supported on the pivot plates 32 through the pivot shaft 15p, as in the above-described embodiment, exertion of a lateral force on a grounding point T (see FIG. 1) of the rear wheel 13R results in that a torsional deformation or a bending deformation is generated in the cross member 33 or the coupling part 40. This has been confirmed by an analysis conducted by the present inventors using CAE (Computer Aided Engineering).

Therefore, where the coupling part 40 is set to be the elastic coupling part having the first and second members 41 and 42 and the vibration insulating member 43, it becomes easy to adjust vibration characteristics while securing the rigidity, particularly, torsional rigidity, of the vehicle body.

Setting the coupling part 40 to be the elastic coupling part having the first and second members 41 and 42 and the vibration insulating member 43 is especially effective in suppressing a weaving mode, which may be generated in a two-wheel vehicle during operation.

The weaving mode is one of vibration phenomena peculiar to a two-wheel vehicle during operation, and is a complicated compound motion (vibration mode) including lateral motions, yawing and rolling. The vibration frequency in the weaving mode is 1 to 4 Hz, and is dependent on vehicle speed. More specifically, the frequency tends to increase with an increase in the vehicle speed.

When the weaving mode is generated, dynamic deformations (vibration) due to lateral forces and the like are generated in the coupling part 40. Therefore, where the coupling part 40 is set to be the elastic coupling part having the first and second members 41 and 42 and the vibration insulating member 43, it is possible to convert the deformational energy of the vehicle body into heat, and thereby to converge the weaving mode in a short time.

(b) Since the first member 41 and the second member 42 are set to overlap with each other along the vehicle width direction, it is easy to secure the rigidity of the vehicle body (vehicle body frame). At the same time, since the overlapping parts of the first and second members 41, 42 are elastically coupled to each other through the vibration insulating member 43, it is easy to secure the volume (capacity) of the vibration insulating member 43 and to secure a damping ability. Accordingly, it is possible to secure the rigidity of the vehicle body and simultaneously to widen the span of adjustable range of vibration characteristics, which makes it easy to adjust the vibration characteristics.

(c) Furthermore, since both the first member 41 and the second member 42 are L shaped in section as viewed in the vehicle width direction, it is easy to further enhance the rigidity of the vehicle body. At the same time, since the first member 41 and the second member 42 are elastically coupled to each other through the vibration insulating member 43 along the L shape thereof, the overlapping portions of the first member 41 and the second member 42 can be enlarged. This makes it easier to secure the volume (capacity) of the vibration insulating member 43, and makes it easy to secure a damping ability even in slight deformations of the vehicle body frame 20. Accordingly, it is easier to secure the rigidity of the vehicle body and, simultaneously, it is possible to further widen the span of adjustable range of vibration characteristics, which makes it easier to adjust the vibration characteristics.

Figure 5:
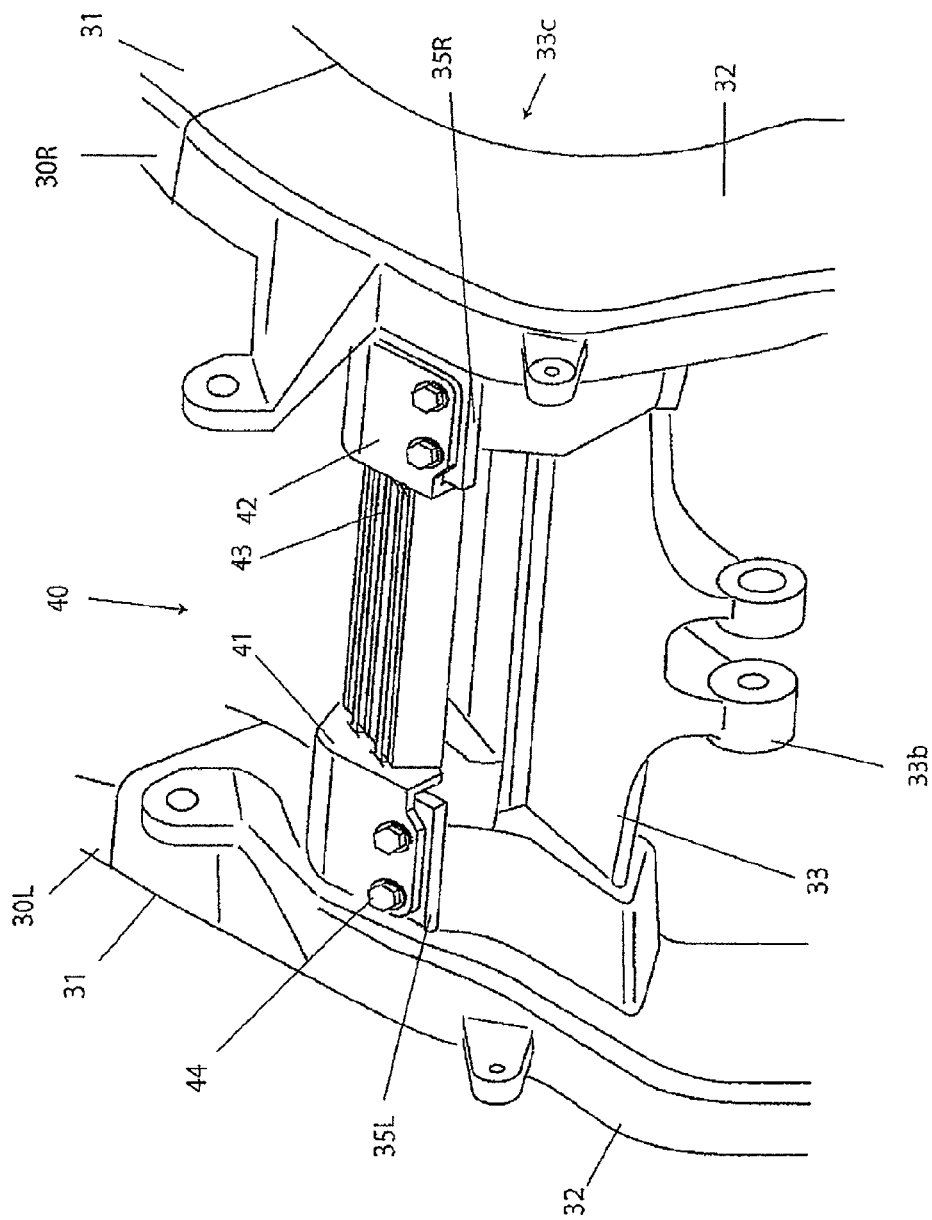
FIG. 5 is a perspective view, from a skew rear side, of a major part of a vehicle body frame in another embodiment.
Figure 6:
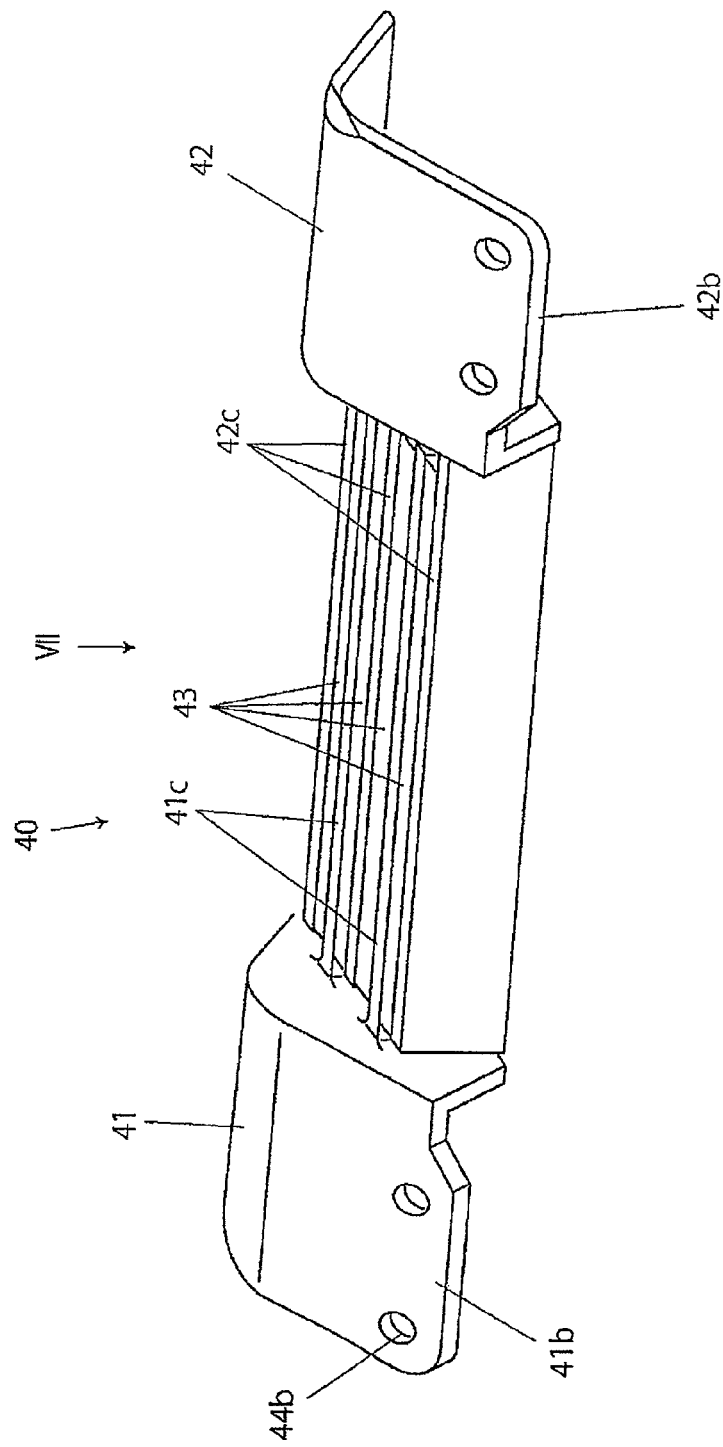
FIG. 6 is a perspective view of an elastic coupling part.
Figure 7:
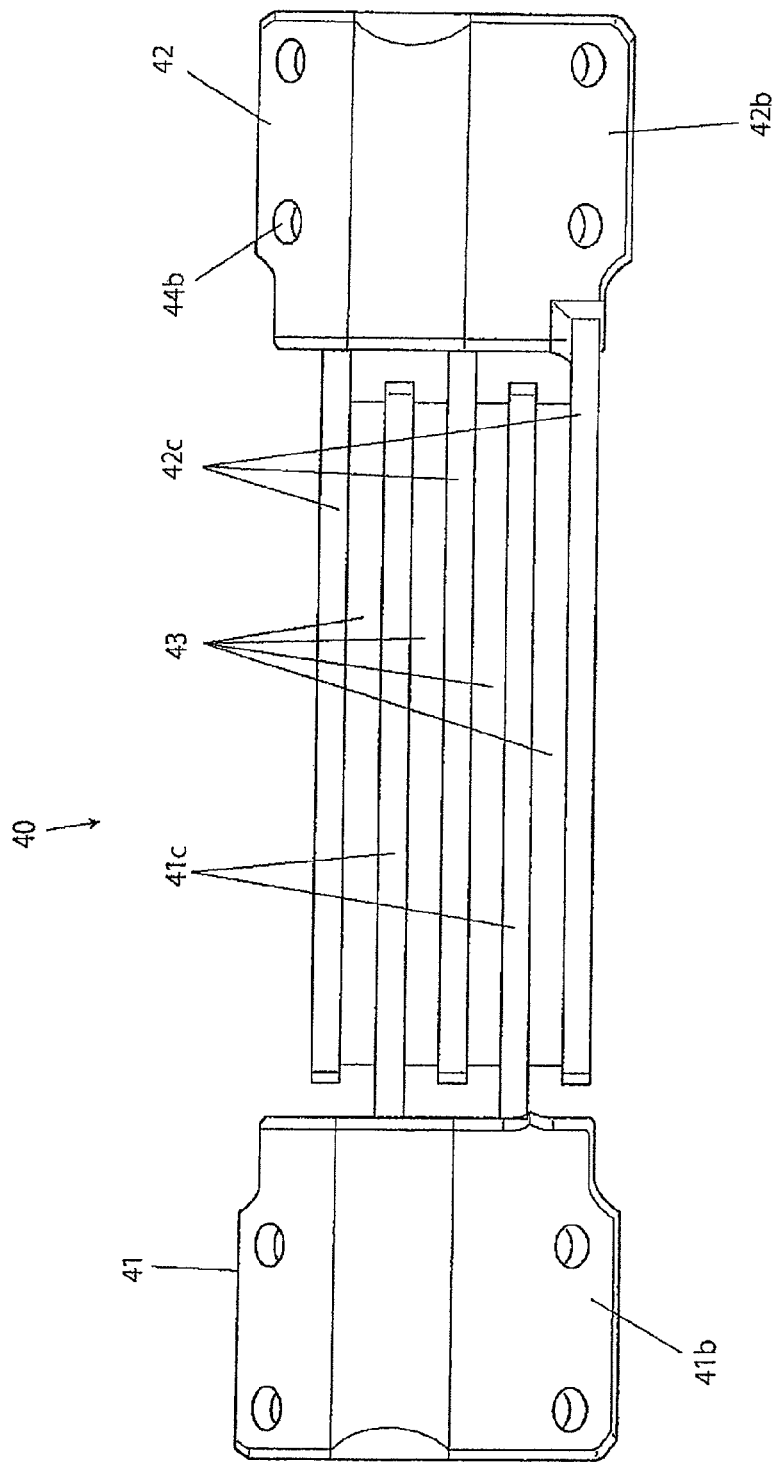
FIG. 7 is a view taken along arrow VII of FIG. 6.

FIG. 5 is a perspective view, from a skew rear side, of a major part of the vehicle body frame 20 in another embodiment of the present invention, FIG. 6 is a perspective view of an elastic coupling part, and FIG. 7 is a view taken along arrow VII of FIG. 6. In FIGS. 5-7, the members or parts identical or corresponding to the members or parts in the above-described embodiment are denoted by the same reference symbols as used above.

This embodiment differs from the above-described embodiment only in the configuration of the elastic coupling part 40, the other points being the same as above.

The elastic coupling part 40 in this embodiment is characterized in that each of a first member 41 and a second member 42 has a mounting part 41b, 42b for mounting to a frame (30L, 30R), and a plurality of extending parts 41c, 42c extending in the vehicle width direction from the mounting part 41b, 42b, and that a vibration insulating member 43 is provided between the adjacent pairs of the extending parts 41c, 42c.

In this embodiment, three extending parts 42c are provided to be integral with the mounting part 42b of the second member 42, whereas two extending parts 41c to be put between the extending parts 42c are provided to be integral with the mounting part 41b of the first member 41, and these extending parts (42c, 41c) are coupled together by use of four vibration insulating members 43. The numbers of the extending parts 41c and 42c can be set as required. In addition, these extending parts may also be configured to be L shaped in section, like the extending parts 41c and 42c shown in FIG. 4. For example, a configuration may be adopted in which, in FIG. 4, another extending part 41c (not shown) is provided to be integral with the mounting part 41b of the first member 41 in such a manner as to be disposed on the lower side of the extending part 42c of the second member 42, and this another extending part 41c and the extending part 42c are coupled to each other through a vibration insulating member 43 (not shown).

According to this embodiment, the following operational advantage can be obtained, in addition to the operational advantages offered by the above-described embodiment.

In this embodiment, the left and right frames 30L and 30R are elastically coupled together through a plurality of (in the example shown, four) layers each of which is composed of the extending parts (41c, 42c) and the vibration insulating member 43. Therefore, it is possible to adjust the rigidity and vibration characteristics of the vehicle body easily and delicately.

Figure 8A:
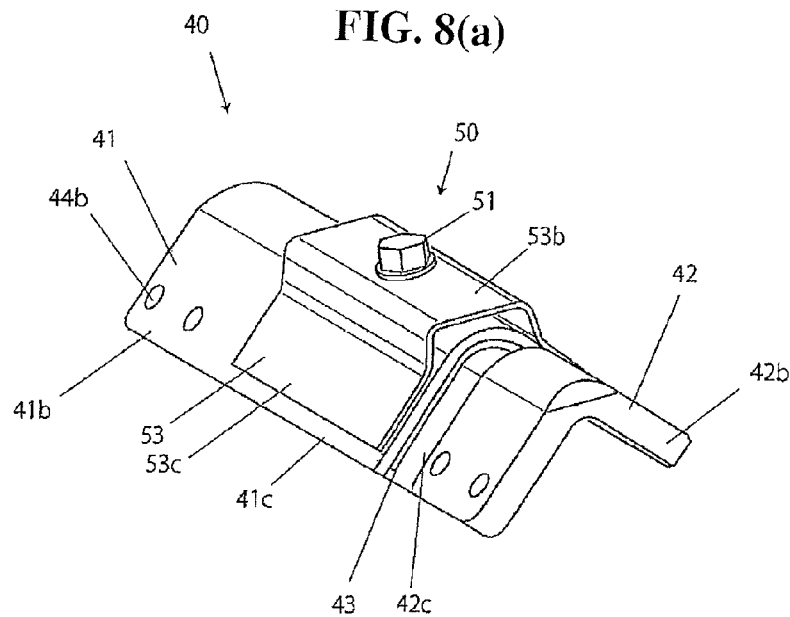
Figure 8B:
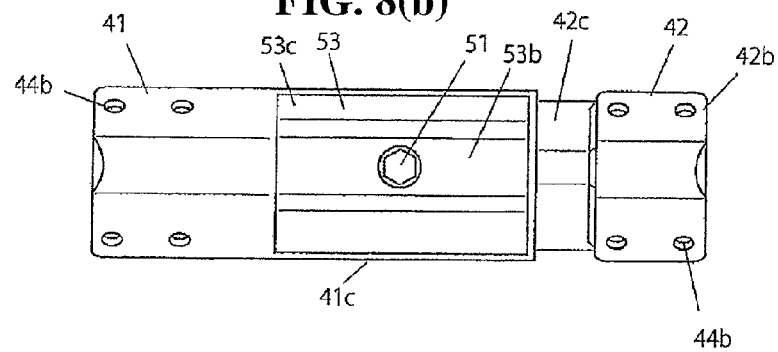
Figure 8C:
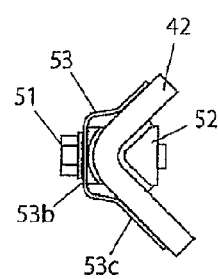
Figure 8D:
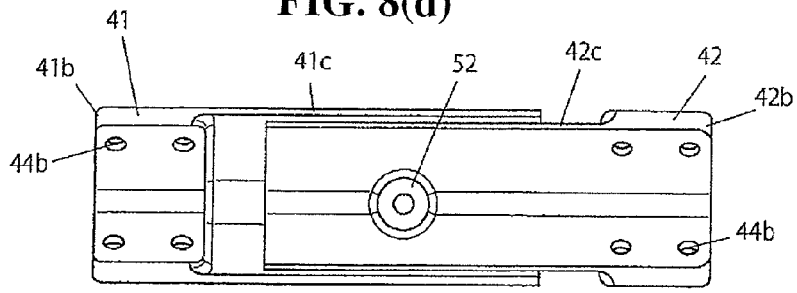

FIGS. 8(a) to 8(d) are views illustrating a further modification of the elastic coupling part 40, wherein FIG. 8(a) is a perspective view, FIG. 8(b) is a plan view, FIG. 8(c) is a side view of FIG. 8(b), and FIG. 8(d) is a bottom view. In FIGS. 8(a) to 8)d), the parts identical or corresponding to the parts of the elastic coupling part in the above-described embodiment are denoted by the same reference symbols as used above.

This elastic coupling part 40 differs from the elastic coupling part 40 shown in FIG. 4 in that it has a fastening member 50 for fastening a first member 41 and a second member 42 through a vibration insulating member 43 while compressing the vibration insulating member 43, with the other points being the same as above.

The fastening member 50 shown in the figure has a bolt 51, a female screw part 52 to be screw engaged to the bolt 51, and a back-up spring 53.

The female screw part 52 is formed integrally with a bottom portion of the second member 42.

The back-up spring 53 has a receiving part 53b for a head portion of the bolt 51, and a spring part 53c integral with the receiving part 53b. The spring part 53c is in the form of an obtuse "V" separated at the vertex thereof in side view, and the included angle (the internal angle in a free state) thereof is smaller than the included angle of the extending part 41c of the first member 41.

Therefore, as shown in FIG. 4, when the bolt 51 and the female screw part 52 are fastened through the back-up spring 53, the back-up spring 53 is deformed according to the fastening force. As a result, the first member 41 and the second member 42 are fastened to each other by a spring force according to the deformation, and the vibration insulating member 43 is compressed according to the fastening force.

This configuration ensures that the spring constant and damping characteristics of the elastic coupling part 40 can be adjusted by regulating the fastening force exerted by the fastening member 50. Therefore, the rigidity and the vibration characteristics of the vehicle body can be adjusted simultaneously and easily.

For example, the rigidity and the vibration characteristics of the vehicle body can be finely adjusted by regulating the fastening force exerted by the fastening member 50 according to a tire, a road surface, an outside air temperature, a weight distribution or the like.

In addition, the rigidity and the vibration characteristics of the vehicle body can be finely adjusted by regulating the fastening force exerted by the fastening member 50 according to an operating mode (a course or the vehicle speed).

Specifically, for example:

when it is necessary to absorb large disturbances at a high vehicle speed, the fastening force exerted by the fastening member 50 may be reduced to lower the spring constant, whereby it is possible to increase the displacement amount of the elastic coupling part 40, to increase the amount of energy absorbed by the elastic coupling part 40, and to enhance the converging effect on disturbances;

when quick response of the vehicle body is demanded at a medium vehicle speed, the fastening force exerted by the fastening member 50 may be increased to raise the spring constant, whereby it is possible to decrease the displacement amount of the elastic coupling part 40, and to enhance the responsiveness of the vehicle body; and in a continuous slalom running (driving with quick changes of steering direction accompanied by steering) at a low vehicle speed, the fastening force exerted by the fastening member 50 may be reduced to lower the spring constant, whereby it is possible to enhance the tight turning performance utilizing the rear-wheel steering.

In addition, in the elastic coupling part 40 shown in FIGS. 8(a) to 8(d), since the first and second members 41 and 42 themselves have a certain extent of spring properties, a fastened state of the first and second members 41 and 42 and a compressed state of the vibration insulating member 43 according to the fastening force of the fastening member 50 can be obtained. Thus, the above-mentioned operational advantages can be obtained, even if the back-up spring 53 is not necessarily provided. However, the use of the back-up spring 53 makes it easy to obtain a uniform compressed state with respect to the vibration insulating member 43. Accordingly, it is desirable to provide the back-up spring 53, for adjusting the damping characteristics.

In addition, a plurality of the bolts 51 and a plurality of the female screw parts 52 may be arranged along the vehicle width direction. Such a configuration makes it easy to obtain a more uniform compressed state with respect to the vibration insulating member 43, which is further desirable for adjusting the damping characteristics.

Figure 9A:
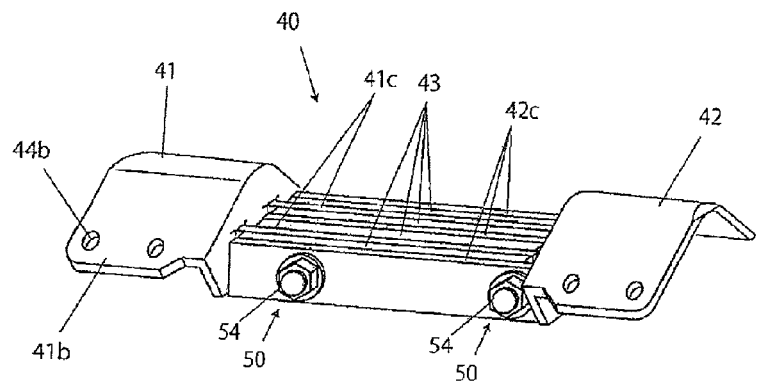
Figure 9B:
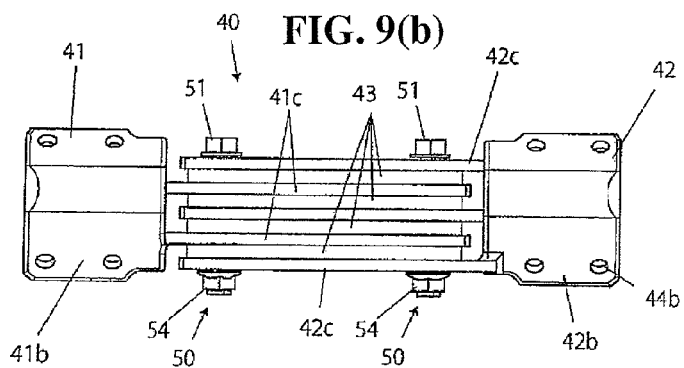
Figure 9C:
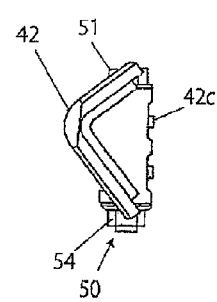
Figure 9D:
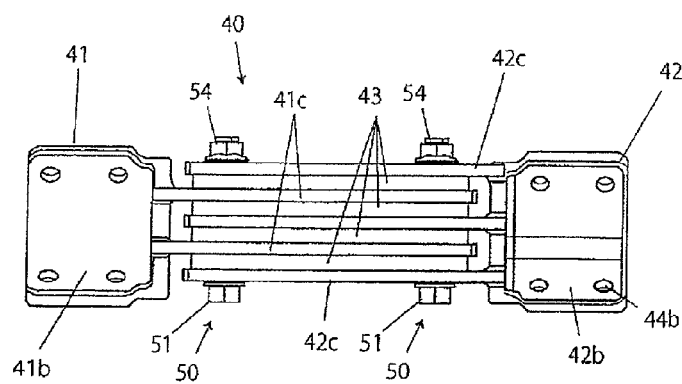

FIGS. 9(a) to 9(d) are views illustrating another modification of the elastic coupling part 40, wherein FIG. 9(a) is a perspective view, FIG. 9(b) is a plan view, FIG. 9(c) is a side view of FIG. 9(b), and FIG. 9(d) is a bottom view. In FIGS. 9(a) to 9(d), the parts identical or corresponding to the parts of the elastic coupling part in the above-described embodiment are denoted by the same reference symbols as used above.

This elastic coupling part 40 is different from the elastic coupling part 40 shown in FIG. 6 in that a plurality of fastening members 50 are provided for fastening a first member 41 and a second member 42 to each other through a vibration insulating member 43 while compressing the vibration insulating member 43, with the other points being the same as above.

The fastening members 50 shown in FIG. 6 each have a bolt 51 and a nut 54.

When the bolts and nuts 51 and 54 are fastened together, the first member 41 and the second member 42 are fastened to each other according to the fastening forces, and the vibration insulating member 43 is compressed according to the fastening forces.

Therefore, with this elastic coupling part 40, also, the spring constant and damping characteristics of the elastic coupling part 40 can be adjusted by regulating the fastening forces exerted by the fastening members 50. Therefore, the rigidity and the vibration characteristics of the vehicle body can be adjusted simultaneously and easily. In other words, the same operational advantages as those in the example shown in FIGS. 8(a) to 8(d) can be obtained.

In addition, by regulating the fastening forces exerted by the plurality of fastening members 50, the rigidity and the vibration characteristics of the vehicle body can be adjusted simultaneously, easily and delicately.

Figure 10A:
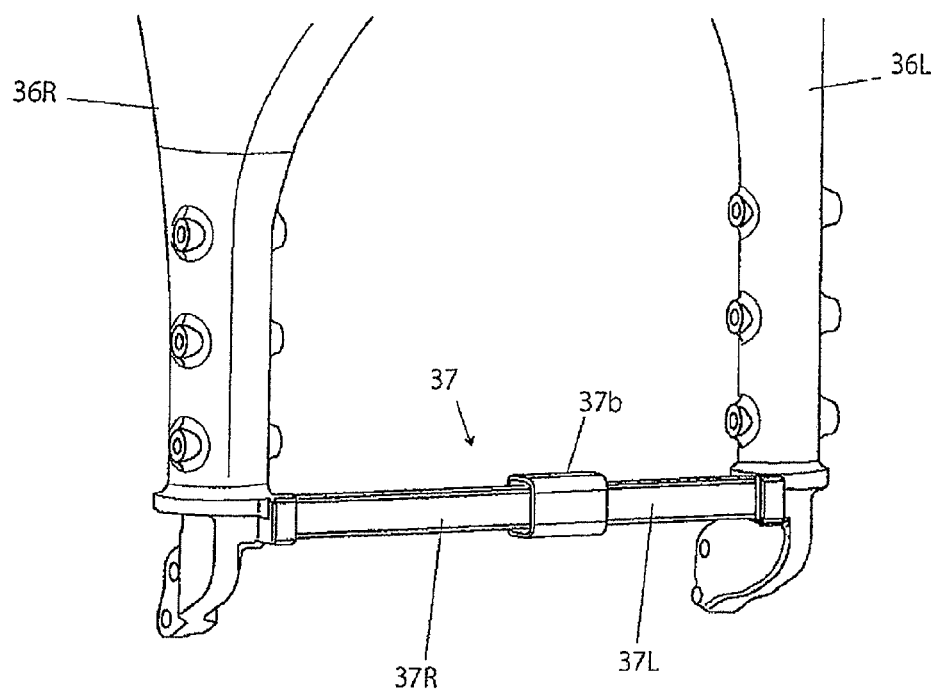
Figure 10B:
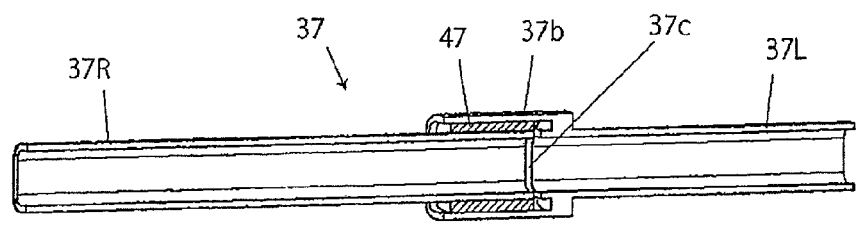

FIGS. 10(a) and 10(b) are views showing a modification of the vehicle body frame 20, wherein FIG. 10(a) is a perspective view from the front side, and FIG. 10(b) is a sectional view of a major part. In FIGS. 10(a) and 10(b), the parts identical or corresponding to the parts of the vehicle body frame in the above-described embodiment are denoted by the same reference symbols as used above.

This vehicle body frame 20 differs from the vehicle body frame 20 shown in FIG. 2 in that a cross pipe 37 as a cross member for coupling down tubes 36L and 36R to each other is configured to be an elastic coupling part, with the other points being the same as above.

The cross pipe 37 has a first pipe 37L as the first member, a second pipe 37R as the second member, and a vibration insulating member 47 which is provided between the first pipe 37L and the second pipe 37R and which elastically couple the first and second pipes 37L and 37R to each other.

As shown in FIG. 10(b), the first pipe 37L is integrally provided with an outer tube 37b at its tip portion, and a tip portion of the second pipe 37R is disposed inside the outer tube 37b, whereby the first pipe 37L and the second pipe 37R are set to overlap with each other along the vehicle width direction. The overlapping parts are elastically coupled to each other by the vibration insulating member 47. The vibration insulating member 47 is tubular in shape. An outer peripheral surface of the vibration insulating member 47 is adhered to an inner peripheral surface of the outer tube 37b, and an inner peripheral surface of the vibration insulating member 47 is adhered to an outer peripheral surface of the tip portion of the second pipe 37R. The vibration insulating member 47 can be formed of a vibration isolating rubber, and, as the adhesion means for the adhesion thereof to the first and second pipes 37L and 37R, a known adhesion means (for example, vulcanization adhesion or the like) can be used. In addition, a gap 37c is provided between the tip of an inner tube portion of the first pipe 37L and the tip of the second pipe 37R.

In such a frame structure, not only the elastic coupling part 40 but also the cross pipe 37 is configured as an elastic coupling part, whereby the rigidity and the vibration characteristics of the vehicle body frame 20 can be adjusted simultaneously on the front and rear sides of the engine 14.

Figure 11A:
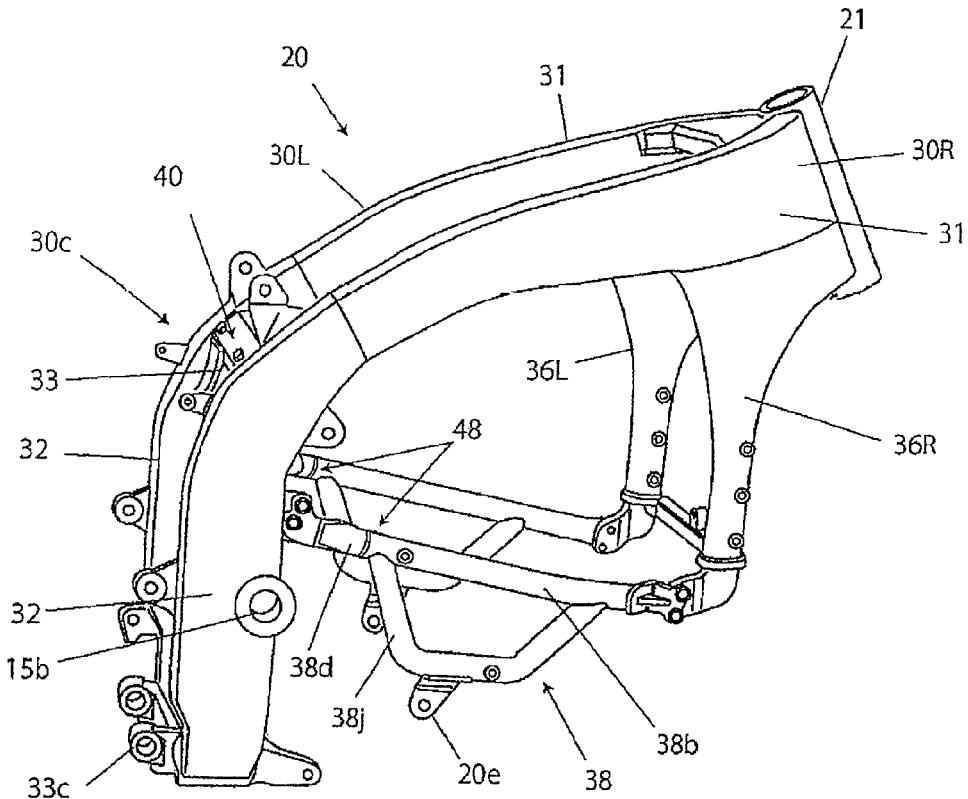
Figure 11B:
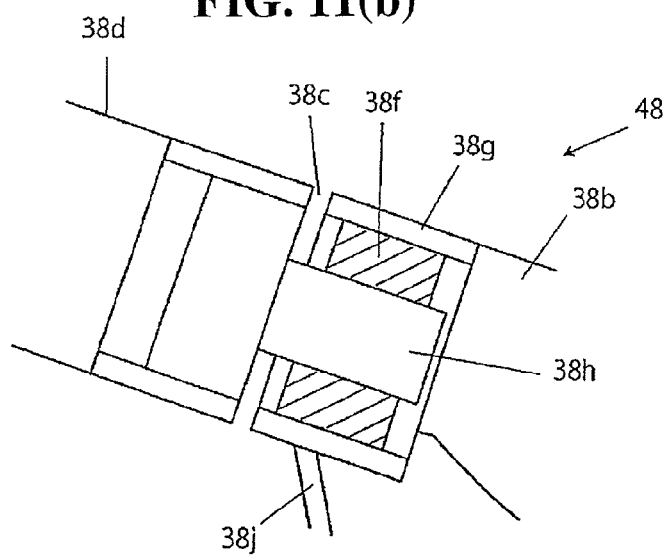

FIGS. 11(a) and 11(b) are views illustrating a further modification of the vehicle body frame 20, wherein FIG. 11(a) is a perspective view, and FIG. 11(b) is an enlarged sectional view of a major part. In FIGS. 11(a) and 11(b), the parts identical or corresponding to the parts of the vehicle body frame 20 (FIG. 2) in the above-described embodiment are denoted by the same reference symbols as used above.

The vehicle body frame 20 shown in FIGS. 11(a) and 11(b) differ from the vehicle body frame 20 shown in FIG. 2 in that left and right down tubes 36L and 36R and pivot plates 32, 32 are coupled together respectively through reinforcement frames 38 and that each of the reinforcement frames 38 is also provided with an elastic coupling part 48, with the other points being the same as above.

The reinforcement frame 38 has a front frame 38b coupled to the down tube 36 (L, R), a rear frame 38d coupled to the pivot plate 32, and a vibration insulating member 38f which is provided between the front frame 38b and the rear frame 38d and which elastically couple the front frame 38b and the rear frame 38d to each other.

As shown in FIG. 11(b), the front frame 38b is integrally provided with an outer tube 38g at its rear end portion, and a small diameter part 38h provided to be integral with the tip of the rear frame 38d is disposed inside the outer tube 38g. As a result, the front frame 38b and the rear frame 38d overlap with each other along the front-rear direction of the vehicle body, and their overlapping parts are elastically coupled together through the vibration insulating member 38f. The vibration insulating member 38f is tubular in shape, an outer peripheral surface of the vibration insulating member 38f is adhered to an inner peripheral surface of the outer tube 38g, and an inner peripheral surface of the vibration insulating member 38f is adhered to an outer peripheral surface of a small diameter part 38h at a tip portion of the rear frame 38d. The vibration insulating member 38f may be formed of a vibration isolating rubber, and, as the adhesion means for adhesion thereof to the front frame 38b and the rear frame 38d, a known adhesion means can be used. In addition, a gap 38c is provided between the rear end of an outer tube portion of the front frame 38b and the tip of a large diameter portion of the rear frame 38d. Further, an engine suspension part 38j is integrally drooping from the front frame 38b, and has a fixing part 20e for the engine.

In such a frame structure, not only the elastic coupling part 40 but also reinforcement frames 38 disposed on the left and right sides of the engine 14 are also configured as elastic coupling parts, whereby the rigidity and the vibration characteristics of the vehicle body frame 20 can be adjusted simultaneously on the left and right sides of the engine 14.

Figure 12A:
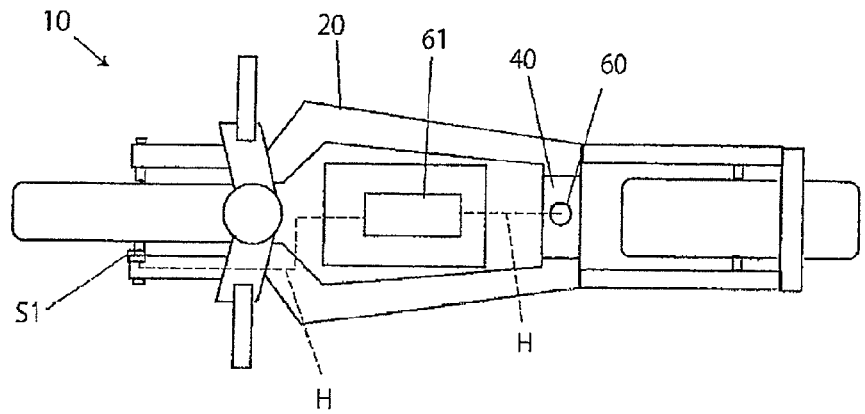
Figure 12B:
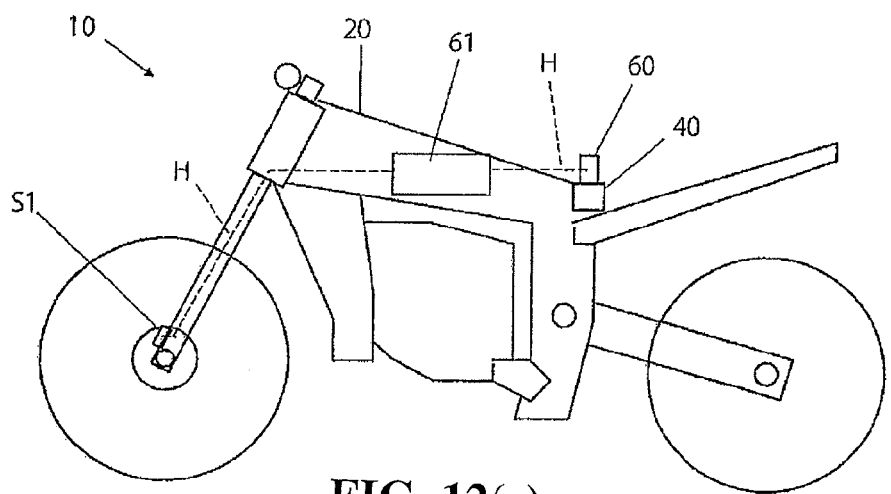
Figure 12C:
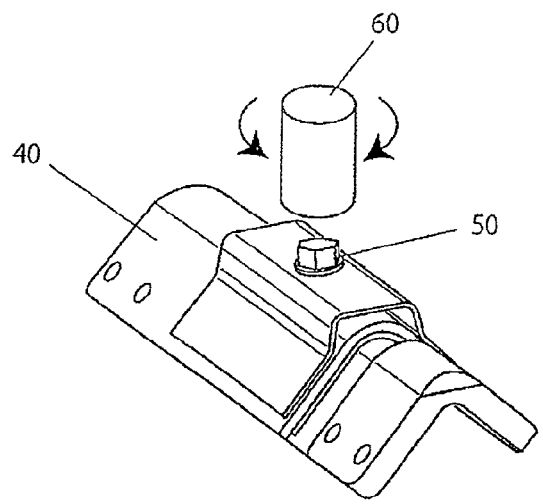

FIGS. 12(a) to 12(c) are schematic views illustrating another embodiment of the motorcycle according to the present invention, wherein FIG. 12(a) is a plan view, FIG. 12(b) is a side view, and FIG. 12(c) is a schematic perspective view of an actuator for operating a fastening member 50. In FIGS. 12(a) to 12(c), the parts identical or corresponding to the parts in the above-described embodiment are denoted by the same reference symbols as used above.

This embodiment is characterized in that an actuator 60 for operating the above-mentioned fastening member 50, a vehicle speed sensor S1 for detecting the vehicle speed of the motorcycle, and a control unit 61 for controlling the operation of the fastening member 50 on the basis of the vehicle speed detected by the vehicle speed sensor S1 to thereby adjust a fastening force with which first and second members 41 and 42 are fastened together by the fastening member 50 and adjust the compressing force exerted on a vibration insulating member 43 by the fastening member 50, are provided.

In addition, in the case where a plurality of bolts 51 of the fastening members 50 are provided (in the case of the structure shown in FIGS. 9(a) to 9(d), for example), the actuators 60 are also provided in the same number as the number of the bolts 51.

The actuator 60 can be composed of a wrench which is engaged with a head portion of the bolt 51 and with which the bolt 51 can be turned both in a tightening direction and in an untightening direction, and may be composed of a wrench equipped with a rotational position sensor capable of detecting the rotational position of the wrench.

The vehicle speed sensor S1 can be composed of a known sensor. In this embodiment, the vehicle speed sensor S1 is composed of a sensor for detecting the vehicle speed by detecting the rotating speed of the front wheel 13F.

The control unit 61 can be composed of a controller for performing all the controls that are required in the motorcycle. The control unit 61 has a table in which the vehicle speed and the rotational position of the actuator 60 are given in correspondence with each other. Based on the table and according to the vehicle speed detected by the vehicle speed sensor S1, the control unit 61 rotates the actuator 60 to a predetermined position (namely, rotates the bolt 51 to a predetermined position), thereby to adjust the fastening force for fastening the first and second members 41 and 42 to each other and to adjust the compressing force exerted on the vibration insulating member 43. In addition, a wiring (harness) H is provided for connection between the sensor and the control unit 61 and connection between the control unit 61 and the actuator 60.

Figure 13:
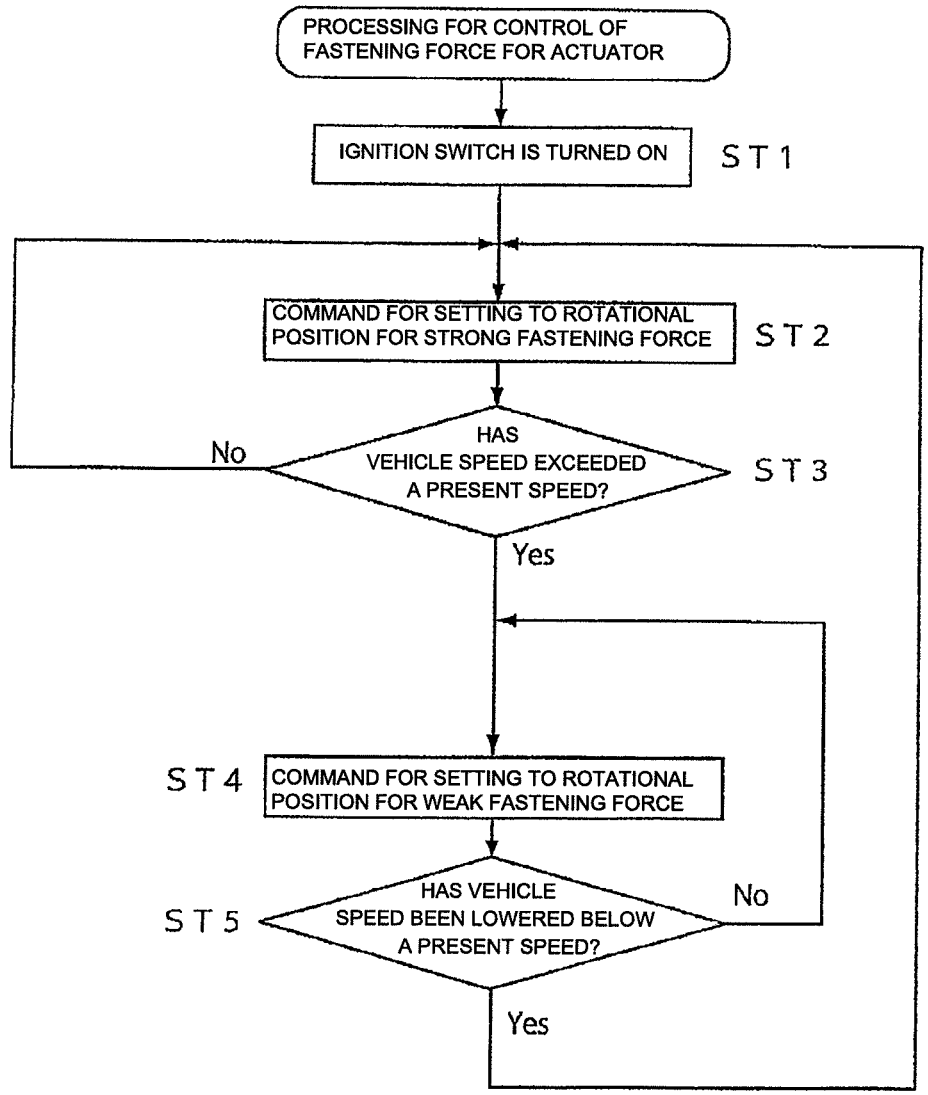
FIG. 13 is a flow chart for an example of a control performed by a control unit.

FIG. 13 is a flow chart for an example of a control performed by the control unit 61.

As shown in the flow chart, when an ignition switch is turned ON in step ST1, the control unit 61 in step ST2 first rotates the actuator 60 (and, hence, the bolt 51) to a position for strengthening the fastening force exerted by the fastening member 50.

As a result, the displacement amount of the elastic coupling part 40 is reduced, and the motorcycle 10 is permitted to run at low and medium speeds in the state of being enhanced in responsiveness of the vehicle body. This state is maintained until it is determined in step ST3 that the vehicle speed has exceeded a preset speed.

When it is determined in step ST3 that the vehicle speed has exceeded the preset value, the control unit 61 in step ST4 rotates the actuator 60 (and, hence, the bolt 51) to a position for weakening the fastening force exerted by the fastening member 50.

As a result, the elastic coupling part 40 can be displaced largely, and the motorcycle 10 can operate at a high speed in the state of being enhanced in a converging effect on disturbances. This state is maintained until it is determined in step ST5 that the vehicle speed has been lowered below a preset speed.

When it is determined in step ST5 that the vehicle speed has been lowered below the preset speed, the control 61 returns to step ST2, and repeats the control of step ST2 and the subsequent steps.

Thus, according to this embodiment, during the operation of the motorcycle 10, the rigidity and the vibration characteristics of the vehicle body according to the vehicle speed can be obtained automatically and at any time.

Figure 14A:
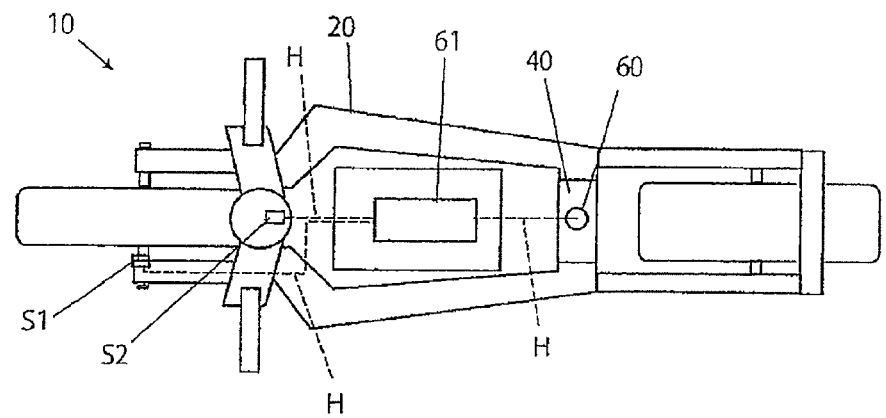
Figure 14B:
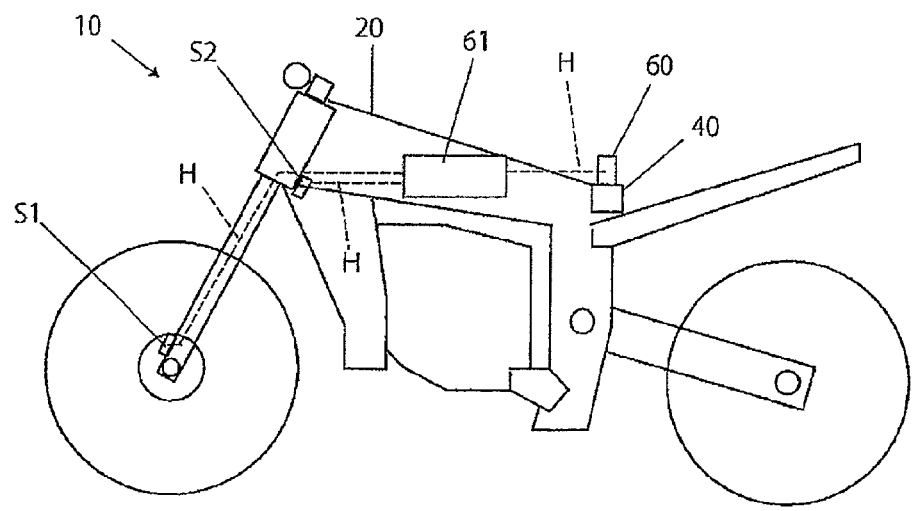

FIGS. 14(a) and 14(b) are schematic views illustrating a further embodiment of the motorcycle according to the present invention, wherein FIG. 14(a) is a plan view, and FIG. 14(b) is a side view. In FIGS. 14(a) and 14(b), the parts identical or corresponding to the parts in the embodiment shown in FIGS. 12(a) to 12(c) above are denoted by the same reference symbols as used above.

In this embodiment, a steering angle sensor S2 for detecting a steering angle and an angular velocity in steering by the handlebar 12 is provided in addition to the vehicle speed sensor S1.

The control unit 61 controls the operation of the fastening member 50 on the basis of the vehicle speed detected by the vehicle speed sensor S1 and the steering angle and the angular velocity which are detected by the steering angle sensor S2, thereby to adjust the fastening force with which the first and second members 41 and 42 are fastened together by the fastening member 50 and to adjust the compressing force exerted on the vibration insulating member 43 by the fastening member 50.

The steering angle sensor S2 can be configured by use of a known sensor (for example, a sensor using a rotary encoder).

The control unit 61 has a table in which the vehicle speed, the steering angle, the angular velocity, and the rotational position of the actuator 60 are given in correspondence with one another. Based on the table and according to the vehicle speed detected by the vehicle speed sensor S1 and to the steering angle and the angular velocity which are detected by the steering angle sensor S2, the control unit 61 rotates the actuator 60 to a predetermined position (namely, rotates the bolt 51 to a predetermined position), to thereby adjust the fastening force for fastening the first and second members 41 and 42 to each other and to adjust the compressing force exerted on the vibration insulating member 43.

Figure 15:
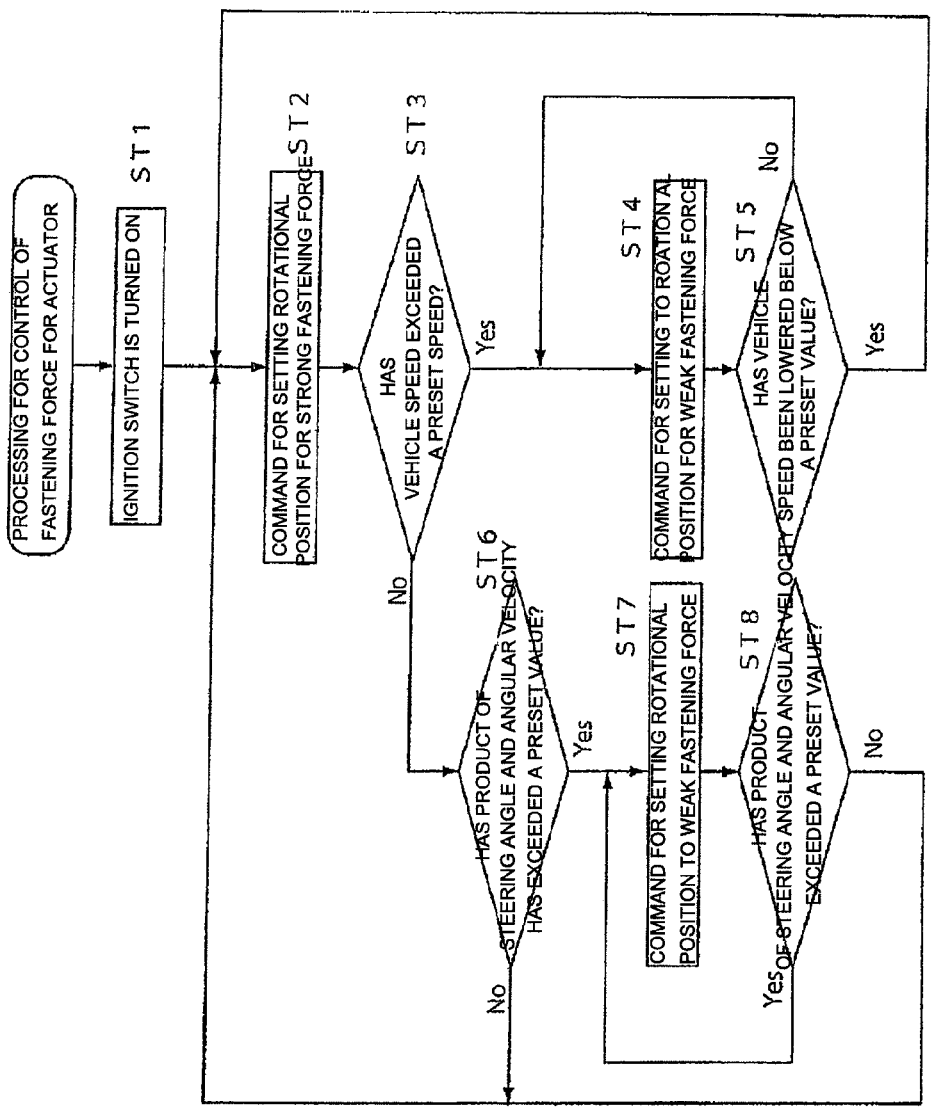
FIG. 15 is a flow chart for an example of a control performed by the control unit.

FIG. 15 is a flow chart for an example of a control by the control unit 61.

As shown in the flow chart, when the ignition switch is turned ON in step ST1, the control unit 61 in step ST2 first rotates the actuator 60 (and, hence, the bolt 51) to a position for strengthening the fastening force exerted by the fastening member 50. Next, in step ST3, the control unit 61 determines whether or not the vehicle speed has exceeded a preset speed.

When it is determined in step ST3 that the vehicle speed has exceeded the preset speed, the control unit 61 in step ST4 rotates the actuator 60 (and, hence, the bolt 51) to a position for weakening the fastening force exerted by the fastening member 50.

As a result, the elastic coupling part 40 can be displaced largely, and the motorcycle 10 can operate at a high speed in the state of being enhanced in a converging effect on disturbances. This state is maintained until it is determined in step ST5 that the vehicle speed has been lowered below a preset speed.

When it is determined in step ST5 that the vehicle speed has been lowered below the preset speed, the control unit 61 returns to step ST2, and repeats the control of step ST2 and the subsequent steps.

When it is determined in step ST3 that the vehicle speed has not exceeded the preset speed, the control unit 61 in step ST6 determines whether or not the product of the steering angle and the angular velocity has exceeded a preset value.

When the product of the steering angle and the angular velocity has not exceeded the preset value, the control unit 61 returns to step ST2, and repeats the control of step ST2 and the subsequent steps.

Therefore, during when the speed is not more than a preset value and the product of the steering angle and the angular velocity is not more than a preset value, the displacement amount of the elastic coupling part 40 is kept small and the motorcycle 10 can operate at low and medium speeds in the state of being enhanced in responsiveness of the vehicle body. This state is maintained until it is determined in step ST3 that the vehicle speed has exceeded the preset value or it is determined in step ST6 that the product of the steering angle and the angular velocity has exceeded the preset value.

When it is determined in step ST6 that the product of the steering angle and the angular velocity has exceeded the preset value, the control unit 61 in step ST7 rotates the actuator 60 (and, hence, the bolt 51) to a position for weakening the fastening force exerted by the fastening member 50.

As a result, the elastic coupling part 40 can be displaced largely, and the motorcycle 10 can be put into a state suited to a continuous slalom operation (driving with quick changes of steering direction accompanied by steering) at a low vehicle speed. This state is maintained until it is determined in step ST8 that the product of the steering angle and the angular velocity has not exceeded a preset value.

Thus, in this embodiment, during operation of the motorcycle 10, the rigidity and the vibration characteristics of the vehicle body according to the vehicle speed, the steering angle and the angular velocity can be obtained automatically and at any time, whereby maneuverability, response performance and ride quality according to the operating conditions can be obtained automatically.

Figure 16A:
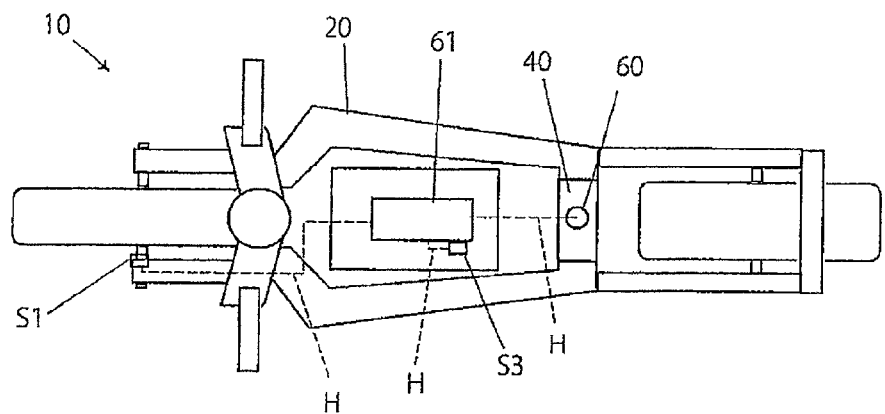
Figure 16B:
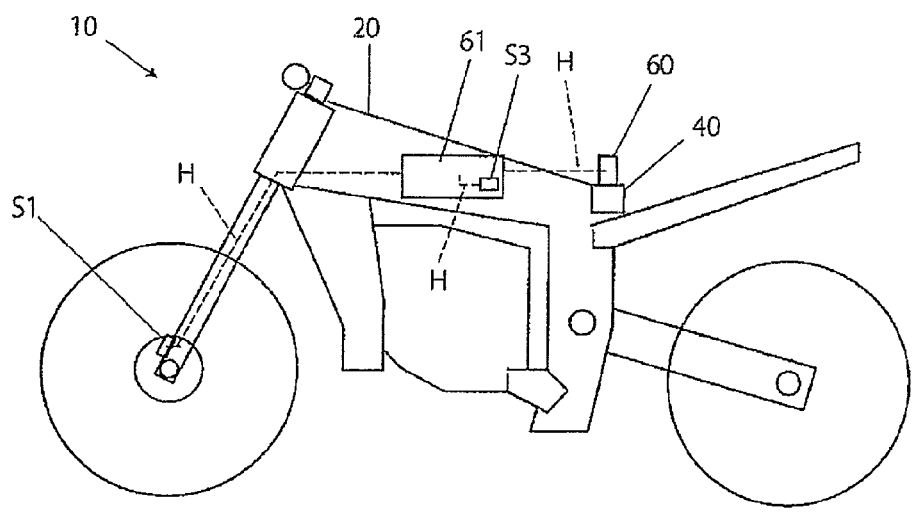

FIGS. 16(a) and 16(b) are schematic views of yet another embodiment of the motorcycle according to the present invention, wherein FIG. 16(a) is a plan view, and FIG. 16(b) is a side view. In FIGS. 16(a) and 16(b), the parts identical or corresponding to the parts in the embodiment shown in FIGS. 12(a) to 12(c) above are denoted by the same reference symbols as used above.

In this embodiment, a yaw rate sensor S3 for detecting the yaw rate of the vehicle body is provided in addition to the vehicle speed sensor S1.

Based on the vehicle speed detected by the vehicle speed sensor S1 and the yaw rate detected by the yaw rate sensor S3, the control unit 61 controls the operation of the fastening member 50, to thereby adjust the fastening force for fastening the first and second members 41 and 42 together by the fastening member 50 and to adjust the compressing force exerted on the vibration insulating member 43 by the fastening member 50.

The yaw rate sensor S3 can be configured by use of a known sensor (for example, a sensor using a piezoelectric ceramic).

The control unit 61 has a table in which the vehicle speed, the yaw rate and the rotational position of the actuator 60 are given in correspondence with one another. Based on the table and according to the vehicle speed detected by the vehicle speed sensor S1 and the yaw rate detected by the yaw rate sensor S3, the control unit 61 rotates the actuator 60 to a predetermined position (namely, rotates the bolt 51 to a predetermined position), to thereby adjust the fastening force for fastening the first and second members 41 and 42 together and to adjust the compressing force exerted on the vibration insulating member 43.

Figure 17:
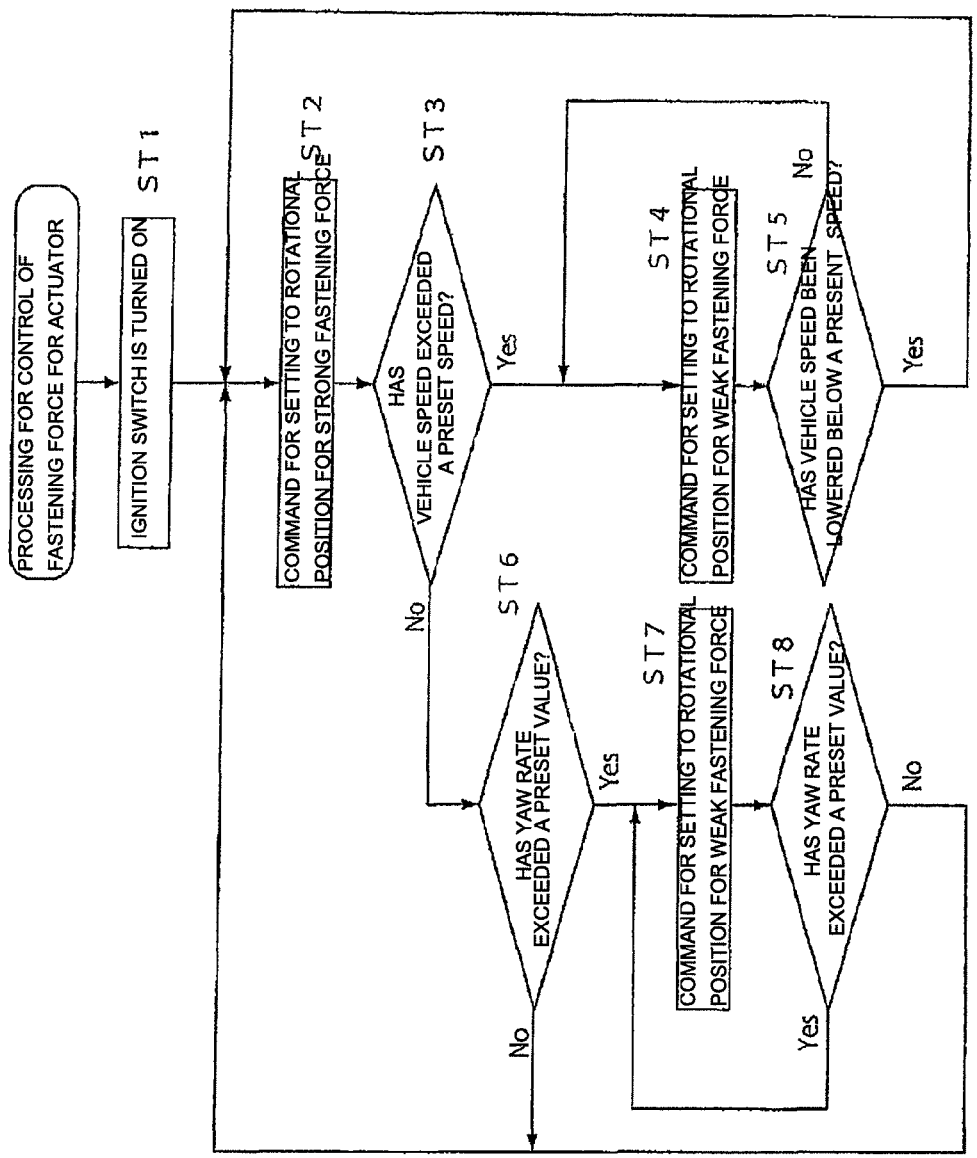
FIG. 17 is a flow chart for an example of a control performed by the control unit.

FIG. 17 is a flow chart for an example of a control by the control unit 61.

As shown in the flow chart, when the ignition switch is turned ON in step ST1, the control unit 61 in step ST2 first rotates the actuator 60 (and, hence, the bolt 51) to a position for strengthening the fastening force exerted by the fastening member 50. Next, in step ST3, the control unit 61 determines whether or not the vehicle speed has exceeded a preset speed.

When it is determined in step ST3 that the vehicle speed has exceeded the preset speed, the control unit 61 in step ST4 rotates the actuator 60 (and, hence, the bolt 51) to a position for weakening the fastening force exerted by the fastening member 50.

As a result, the elastic coupling part 40 can be displaced to a large extent, and the motorcycle 10 can operate at a high speed in the state of being enhanced in a converging effect on disturbances. This state is maintained until it is determined in step ST5 that the vehicle speed has been lowered below a preset speed.

When it is determined in step ST5 that the vehicle speed has been lowered below the preset speed, the control unit 61 returns to step ST2, and repeats the control of step ST2 and the subsequent steps.

When it is determined in step ST3 that the vehicle speed has not exceeded the preset speed, the control unit 61 in step ST6 determines whether or not the yaw rate has exceeded a preset value.

When the yaw rate has not exceeded the preset value, the control unit 61 returns to step ST2, and repeats the control of step ST2 and the subsequent steps.

Therefore, during when the vehicle speed is not more than a preset speed and the yaw rate is not more than a preset value, the displacement amount of the elastic coupling part 40 is kept small, and the motorcycle 10 can operate at low and medium speeds in the state of being enhanced in responsiveness of the vehicle body. This state is maintained until it is determined in step ST3 that the vehicle speed has exceeded the preset speed or it is determined in step ST6 that the yaw rate has exceeded the preset value.

When it is determined in step ST6 that the yaw rate has exceeded the preset value, the control unit 61 in step ST7 rotates the actuator 60 (and, hence, the bolt 51) to a position for weakening the fastening force exerted by the fastening member 50.

As a result, the elastic coupling part 40 can be displaced largely, and the motorcycle 10 is put into a state suitable for operating at a low speed accompanied by large yawing motions. This state is maintained until it is determined in step ST8 that the yaw rate has not exceeded the preset value.

Thus, in this embodiment, during operation of the motorcycle 10, the rigidity and the vibration characteristics according to the vehicle speed and the yaw rate can be obtained automatically and at any time, whereby maneuverability, response performance and ride quality according to the operating conditions can be obtained automatically.

While some embodiments of the present invention have been described above, the invention is not to be limited to the above embodiments, and modifications are possible as required within the scope of the invention. In addition, the above-described embodiments and modifications and the like can be carried out in combinations as desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle having frames disposed on left and right sides of a vehicle body, the motorcycle comprising:
   a first member mounted to one frame of the left and right frames and extending toward the other frame;
   a second member mounted to the other frame of the left and right frames and extending toward the one frame; and
   a vibration insulating member provided between the first member and the second member so as to elastically couple the first and second members to each other,
   wherein each of the first member and the second member has a mounting part for mounting to the frame, and a plurality of extending parts extending in the vehicle width direction from the mounting parts, and the vibration insulating member is provided between each adjacent pair of the extending parts.

2. The motorcycle according to claim 1, wherein the first member and the second member overlap with each other along a vehicle width direction, and overlapping portions of the first and second members are elastically coupled to each other through the vibration insulating member.

3. The motorcycle according to claim 2, and further comprising a fastening member for fastening the first member and the second member to each other through the vibration insulating member while compressing the vibration insulating member.

4. The motorcycle according to claim 1, and further comprising a fastening member for fastening the first member and the second member to each other through the vibration insulating member while compressing the vibration insulating member.

5. The motorcycle according to claim 4, wherein a plurality of the fastening members are provided.

6. The motorcycle according to claim 1, and further comprising a fastening member for fastening the first member and the second member to each other through the vibration insulating member while compressing the vibration insulating member.

7. A frame for a motorcycle comprising:
   a left side frame;
   a right side frame;
   a first member mounted to at least one of the left side frame and the right side frame and extending toward the right side frame or the left side frame;
   a second member mounted to at least one of the right side frame and the left side frame and extending toward the left side frame or the right side frame; and
   a vibration insulating member operatively mounted between the first member and the second member for elastically coupling the first and second members to each other,
   wherein the first member and the second member overlap with each other along a vehicle width direction, and overlapping portions of the first and second members are elastically coupled to each other through the vibration insulating member, and
   wherein both of the first member and the second member are L shaped in section as viewed in the vehicle width direction, and are elastically coupled to each other through the vibration insulating member along the L shape.

8. A motorcycle having frames disposed on left and right sides of a vehicle body, the motorcycle comprising:
   a first member mounted to one frame of the left and right frames and extending toward the other frame;
   a second member mounted to the other frame of the left and right frames and extending toward the one frame; and
   a vibration insulating member provided between the first member and the second member so as to elastically couple the first and second members to each other,
   wherein the first member and the second member overlap with each other along a vehicle width direction, and overlapping portions of the first and second members are elastically coupled to each other through the vibration insulating member, and
   wherein both of the first member and the second member are L shaped in section as viewed in the vehicle width direction, and are elastically coupled to each other through the vibration insulating member along the L shape.

9. A motorcycle having frames disposed on left and right sides of a vehicle body, the motorcycle comprising:
- a first member mounted to one frame of the left and right frames and extending toward the other frame;
- a second member mounted to the other frame of the left and right frames and extending toward the one frame; and
- a vibration insulating member provided between the first member and the second member so as to elastically couple the first and second members to each other,
- wherein the first member and the second member overlap with each other along a vehicle width direction, and overlapping portions of the first and second members are elastically coupled to each other through the vibration insulating member, and
- wherein each of the first member and the second member has a mounting part for mounting to the frame, and a plurality of extending parts extending in the vehicle width direction from the mounting parts, and the vibration insulating member is provided between each adjacent pair of the extending parts.

10. A motorcycle having frames disposed on left and right sides of a vehicle body, the motorcycle comprising:
- a first member mounted to one frame of the left and right frames and extending toward the other frame;
- a second member mounted to the other frame of the left and right frames and extending toward the one frame; and
- a vibration insulating member provided between the first member and the second member so as to elastically couple the first and second members to each other,
- wherein both of the first member and the second member are L shaped in section as viewed in the vehicle width direction, and are elastically coupled to each other through the vibration insulating member along the L shape, and
- wherein each of the first member and the second member has a mounting part for mounting to the frame, and a plurality of extending parts extending in the vehicle width direction from the mounting parts, and the vibration insulating member is provided between each adjacent pair of the extending parts.

11. A motorcycle having frames disposed on left and right sides of a vehicle body, the motorcycle comprising:
- a first member mounted to one frame of the left and right frames and extending toward the other frame;
- a second member mounted to the other frame of the left and right frames and extending toward the one frame;
- a vibration insulating member provided between the first member and the second member so as to elastically couple the first and second members to each other; and
- a fastening member for fastening the first member and the second member to each other through the vibration insulating member while compressing the vibration insulating member,
- wherein both of the first member and the second member are L shaped in section as viewed in the vehicle width direction, and are elastically coupled to each other through the vibration insulating member along the L shape.

12. A frame for a motorcycle comprising:
- a left side frame;
- a right side frame;
- a first member mounted to at least one of the left side frame and the right side frame and extending toward the right side frame or the left side frame;
- a second member mounted to at least one of the right side frame and the left side frame and extending toward the left side frame or the right side frame; and
- a vibration insulating member operatively mounted between the first member and the second member for elastically coupling the first and second members to each other,
- wherein each of the first member and the second member has a mounting part for mounting to the left frame or the right frame, and a plurality of extending parts extending in a vehicle width direction from the mounting parts, and the vibration insulating member is provided between each adjacent pair of the extending parts.

13. The frame for a motorcycle according to claim 12, and further comprising a fastening member for fastening the first member and the second member to each other through the vibration insulating member while compressing the vibration insulating member.

14. The frame for a motorcycle according to claim 13, wherein a plurality of the fastening members are provided.

* * * * *